United States Patent [19]

Crumpler et al.

[11] Patent Number: 4,961,887

[45] Date of Patent: Oct. 9, 1990

[54] BATCH CONTROL SYSTEM AND PROCESS FOR INSULATING A METALLIC ROD

[75] Inventors: Michael G. Crumpler; George W. Barker, III; Darrell L. Smith, all of Carrollton; Willard W. Posey, Temple; Howard S. Shepard, Bremen; Steven R. Campbell, Carrollton, all of Ga.

[73] Assignee: Southwire Company, Carrollton, Ga.

[21] Appl. No.: 231,688

[22] Filed: Aug. 11, 1988

[51] Int. Cl.$^5$ .................. B29C 47/06; B29C 47/92
[52] U.S. Cl. ........................ 264/40.4; 222/58;
    222/77; 264/40.7; 264/174; 264/211; 364/473;
    364/479; 366/18; 366/141; 366/152; 425/113;
    425/140; 425/148; 425/297
[58] Field of Search .............. 264/40.01, 40.4, 40.7,
    264/140, 174, 211; 425/113, 135, 140, 145, 148,
    297; 222/55, 57, 58, 77; 364/468, 473, 476, 478,
    479, 502, 567; 366/18, 141, 152

[56] References Cited

U.S. PATENT DOCUMENTS

| | | | |
|---|---|---|---|
| 3,410,793 | 11/1968 | Stranahan et al. | 364/502 X |
| 3,473,008 | 10/1969 | Bay et al. | 364/502 X |
| 3,940,600 | 2/1976 | Alexander et al. | 364/502 X |
| 3,959,636 | 5/1976 | Johnson et al. | 364/502 X |
| 4,272,824 | 6/1981 | Lewinger et al. | 364/502 |
| 4,333,356 | 6/1982 | Bartels et al. | 73/864.21 |
| 4,469,146 | 9/1984 | Campbell et al. | 364/502 X |
| 4,525,071 | 6/1985 | Horowitz et al. | 366/152 |
| 4,527,245 | 7/1985 | Axelson, Jr. et al. | 364/478 |
| 4,654,801 | 3/1987 | Stewart et al. | 364/502 X |
| 4,701,838 | 10/1987 | Swinkels et al. | 364/502 X |
| 4,705,083 | 11/1987 | Rossetti | 364/479 X |

Primary Examiner—Jeffery Thurlow
Assistant Examiner—Leo B. Tentoni
Attorney, Agent, or Firm—Steven Kreiss; Stanley L. Tate; James W. Wallis, Jr.

[57] ABSTRACT

An apparatus and process for manufacturing insulation for metallic rod which includes a mechanism for housing a plurality of ingredients, scales for weighing a predetermined quantity of each ingredient, a blender for blending predetermined amounts of each ingredient into one material, a mixer to mix the dry blend of ingredients, a mill to form the blended material into strips, a dicer to transform the strips into pellets of insulation, an extruder for placing insulation around the metallic rod, a conveyor to transport the ingredients and/or material between each of the above steps, a controller for outputting commands to the blender and receiving inputs from the scales to obtain the predetermined amount of each ingredient, and a computer for verifying that the correct amount of each ingredient has been obtained. The ingredients used in the manufacture of this insulation material include plasticizers, fillers, a resin, and modifiers. In the step of obtaining the correct weight of each ingredient, the controller employs multiple setpoints to gradually obtain the required ingredient weight through what is known as a dribble feed function.

22 Claims, 35 Drawing Sheets

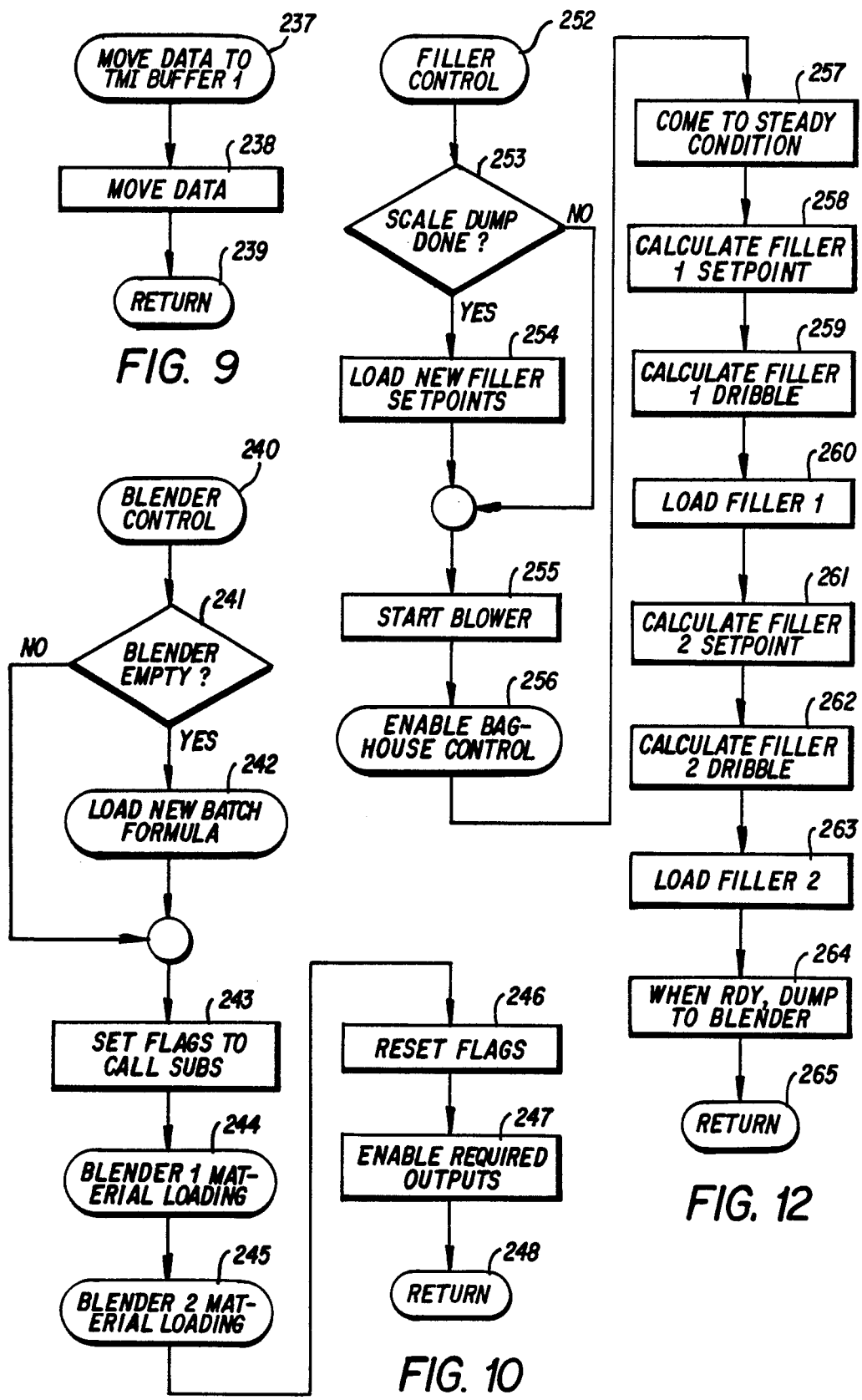

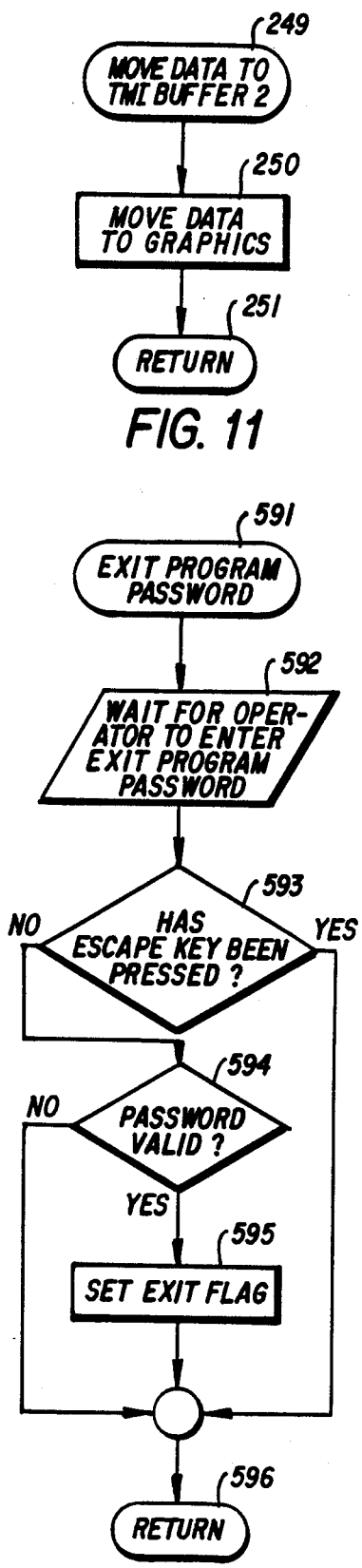
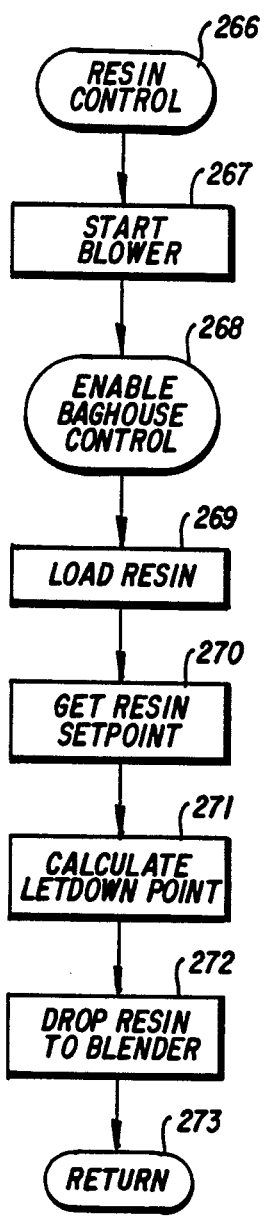
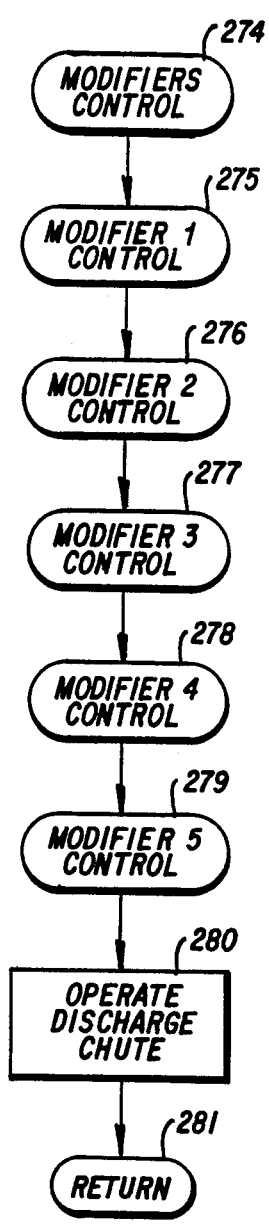
FIG. 11
FIG. 43
FIG. 13
FIG. 14

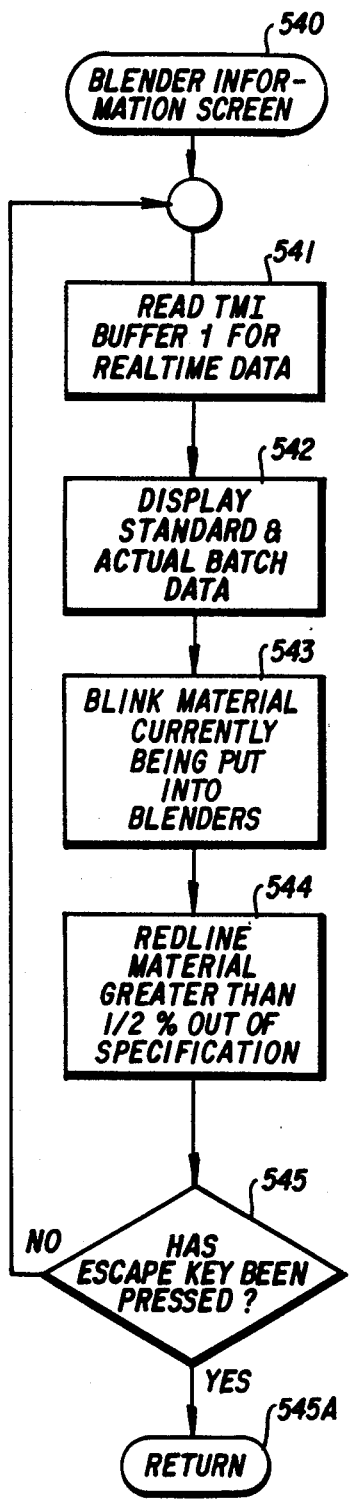
FIG. 35
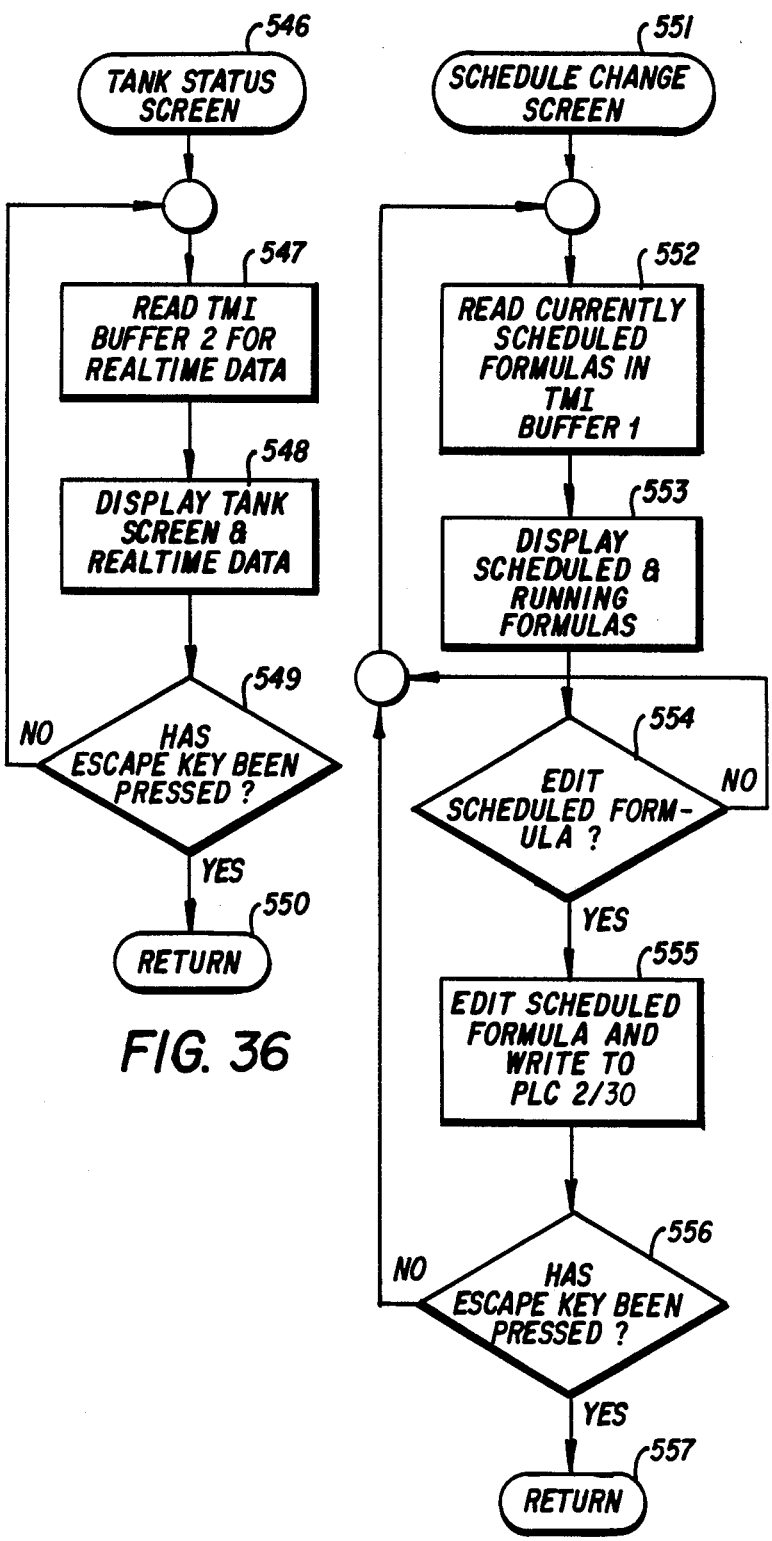
FIG. 36
FIG. 37

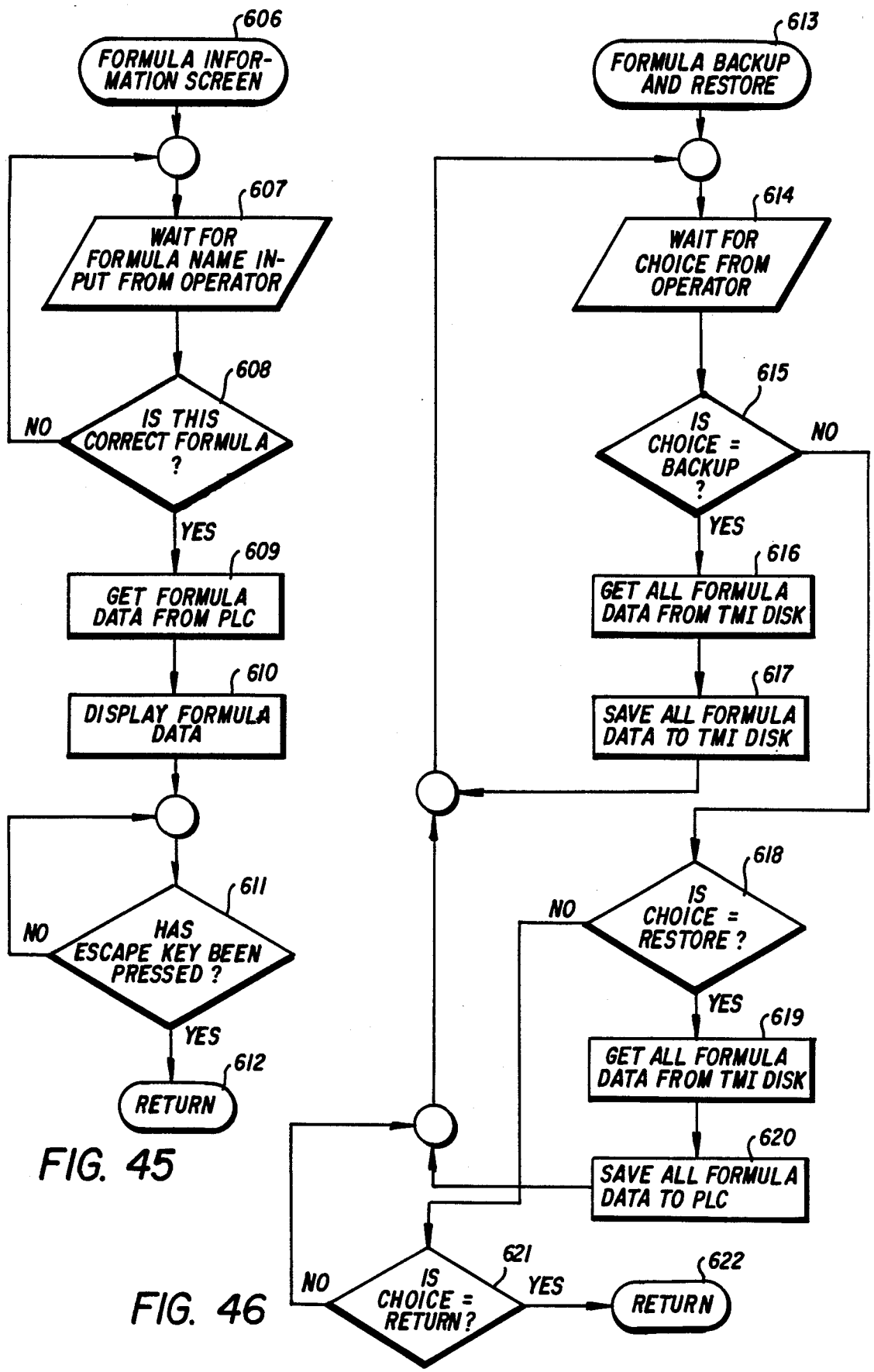

BATCH CONTROL SYSTEM AND PROCESS FOR INSULATING A METALLIC ROD

BACKGROUND OF THE INVENTION

1. Field of the Invention

The field of this invention is a batch control system and process for manufacturing insulation material from two or more ingredients which are blended together in predetermined amounts, according to a specific formula, and extruded to form insulation surrounding a known metallic conductor, such as copper rod.

2. Description of the Prior Art

The monitoring of batching processes for many years has involved the use of a number of different designs employing electronics, timers, controllers, computers, programmable controllers, and other electronic and mechanical devices. Such batching systems convey commodities from one location to another and are commonly used in grain elevator systems, wherein different types of grains from a plurality of bins are conveyed to a common destination to obtain a blend or mixture of commodities. This equipment is often unreliable and confirmation of formula data is extremely difficult to determine visually, through electronics, or through electromechanical parts. Whenever grain blending is performed, discharge gates of the various grain bins are opened based on the percentage of gate opening, not as a percentage of the total flow rate or blend. The percentage of gate opening is frequently different than the percentage of required blend because many extraneous factors affect flow rate. For this reason, the required blending percentages are not accurately derived which leads to a shortcoming of these batching processes.

In more recent times batching systems using minicomputers for the control and monitoring of batching processes have been used successfully, but such batching systems are extremely costly and are only justified for large scale batching operations. When minicomputers have been used as a substitute for prior art relay logic and analog controllers, the cost of the batching system has increased thus not making such batching systems amenable to the use of minicomputers.

Finally, microcomputers have been used to control batching systems. In these systems, to obtain enough speed, often much of the control program had to be written in assembly language. This added greatly to software development and debugging cost, and made field changes to the control program and constants very difficult. Unless a specific debugging device was made available, field debugging of the batching process through the computer was extremely difficult and required a high level of computer skills on the part of a technician.

One example of such a batching system is the Johnson U.S. Pat. No. 3,959,636, incorporated herein by reference thereto, which describes a batching system employing bins, a weighing hopper, a dump and diverter mechanism, a mixer, and a computer control device which includes a basic processor, memory bus structure, and display console. While this computer driven system monitors and controls the batching process, it does not perform the same blending, conveying, control, and interface (with programmable controller) functions as does the computer in the subject invention. More particularly, the Johnson '636 batching system is not suitable for the control and monitoring of a batching system used in the manufacture of insulation for metallic rod because it does not utilize a programmable controller which economically and expeditiously monitors and controls specific steps in the batching process, and provides a debugging means suitable for maintenance technicians unskilled in computer technologies.

Prior to 1984, a batching control system, such as shown in FIG. 1 was used for the manufacture of insulation for metallic rod. Referring to FIG. 1, a formula was entered manually by an operator on a control panel 1. Conveyors 5 forwarded the materials to scales 33 which weighed the material to be made into insulation. The material in the scales was output to valves 4 which directed the materials into 1 of 2 blenders 2. The blenders 2 mixed the various ingredients into a suitable material for futher processing into insulation. The control functions were accomplished by the routing of AC logic signals through various switches and relays to solenoids and motor starter coils. This manual batching system was unreliable, inflexible, and inaccuarate because it was hard-wired and semi-automatic.

Current state of the art is to combine a computer and programmable controller as in the Axelson U.S. Pat. No. 4,527,245. This is done to provide the data handling and display capabilities of a high level language machine, with the control logic, speed, and debugging capability found in current sate of the art programmable controllers. In those state of the art batching systems which utilized a computer and programmable controller in combination, however, such as the Axelson U.S. Pat. No. 4,527,245, the computer and programmable controller were not connected via a network and assumed a master/slave status. The Axelson computer and programmable controller did not monitor and control blenders, scales, valves and conveyor motors through input/output devices, but instead issued commands to a control means (master/slave cylinders) which in turn controlled the opening of a discharge gate means to obtain the required blending percentages.

The subject invention supercedes these state of the art batching systems by incorporating the use of an Allen Bradley Data Highway which is a token passing network designed to remain operational even if one of the attached devices fail. This allows use of modems on the network to establish any fully IBM XT compatible computer as the operator station in case of failure of a TMI computer. It also allows for operation of a debugging terminal concurrent with normal use of the TMI computer and a programmable controller, the PLC 2/30. Operation of this system, moreover, can continue whether or not a computer is available, as long as the programmable controller is reasonably intact.

Another prior art system, depicted in FIG. 2, was used in the period 1984 through 1987 and improved the FIG. 1 pre-1984 batching system. In this system, a programmable controller 6 was used with a series of input/output (I/O) racks 7 to control the blenders 2, valves 4, and conveyor motors 5 and receive inputs from the scales 3, valves 4 and conveyor motors 5 to manufacture insulation for metallic rod. A terminal and operator control panel 8 was used to input desired changes to the system and to deploy desired data. The programmable controllers 6 provided inputs and outputs necessary to control the valves, blowers, screw feeders, etc., which regulated the materials in process and also provided a ladder logic program that optimized real time control of the aforementioned items. The ladder logic program also provided control structures essential to program the driving logic for the system. However, in this 1984–1987 batching system, there was little or no support for mathematical entities over three digits in length, archive data files, data terminal operations, etc., normally associated with the use of a computer. Thus, the traditional programmable controller batching control system was not as accurate as the subject invention and did not have the capability to make the batching system more accurate and reliable.

SUMMARY OF THE INVENTION

The batch system described herein combines the best qualities of both a programmable controller and an industrial microcomputer without the inherent problems described above and seen in other commercially available batch control systems.

This invention uses both a programmable controller and an industrially hardened personal computer connected by and to an industrial network. Heavy math functions, data base and archive activities, and operator terminal functions are supported from this computer and controller level. This allows system scheduling, formula edits, and changing of process variables, such as timer presets, to be performed in a simple, expeditious, economical, menu driven environment. Historical data can be preserved easily for up to several years for use in this invention. Many added and new functions are made available to the batch system, such as scale trending, set point calculations, timer commands or adjustments, placing temporary data in memory, etc., and are performed on demand. Graphic displays show the flow of material through the system, using both text and symbols to depict the process. Troubleshooting screens are available that show programmable controller memory locations, including inputs and outputs. These allow scale analog values, as well as limit switch inputs, starter auxiliary contact inputs, outputs to solenoids, outputs to motor starters, etc., to be read directly. These features shorten the time required to debug the equipment on the plant floor.

Another feature of this system is that real time information required to operate the batch system is stored in the computer memory and in the programmable controller memory. This shared memory concept allows both machines to be updated simultaneously, gives greater data integrity, and will allow the computer to be off-line without shutting down production. Thus, a fault tolerant production process is achieved. In this situation, the programmable controller will continue to run the current formula and will initiate the next scheduled formula. This can give several days of time to service any problem without requiring operator intervention. If this is not enough, the shared memory concept requires very minimal direct memory manipulation by the programmable controller maintenance terminal to change to new formulas and to schedule several more days of automated production.

Another feature of this batch control system allows another personal computer, even an office desktop, to dial into a modem located on the industrial network, and optionally, take over the functions of the operator station that normally reside in the industrially hardened personal computer. In this manner, a complete standby or fault tolerant system is available within a few minutes of failure of the industrially hardened personal computer. The design of the operator terminal program allows it to function either directly connected to the network, in the case of the industrially hardened personal computer, or in another personal computer via a modem.

Additionally, the control program in the programmable controller performs all batch control optimizations. These include allowing for inflight material when calculating setpoints and weights, cutting off material feed prior to the setpoint to allow inflight material to accumulate to the setpoint, and the use of loss in weight calculations in determining setpoint accomplishment where possible. These allow for accuracies of better than 99.5% in normal operation. As mentioned above, formulas may be selected from the maintenance terminal if the personal computer in which the operator terminal program resides, is for some reason incapacitated.

The programmable controller also displays system information via a graphics panel. Valve positions, motor operations, an indication of alarm conditions, are indicated on this panel during normal operation.

DESCRIPTION OF THE DRAWINGS

In the drawings, like reference numerals indicate corresponding parts throughout the several views.

FIGS. 6–46 are logic flow diagrams of various programs and/or subroutines referred to in the PVC batch control main program and/or other subroutines.

DETAILED DESCRIPTION OF THE PREFERRED EMBODIMENT

Figure 3A:
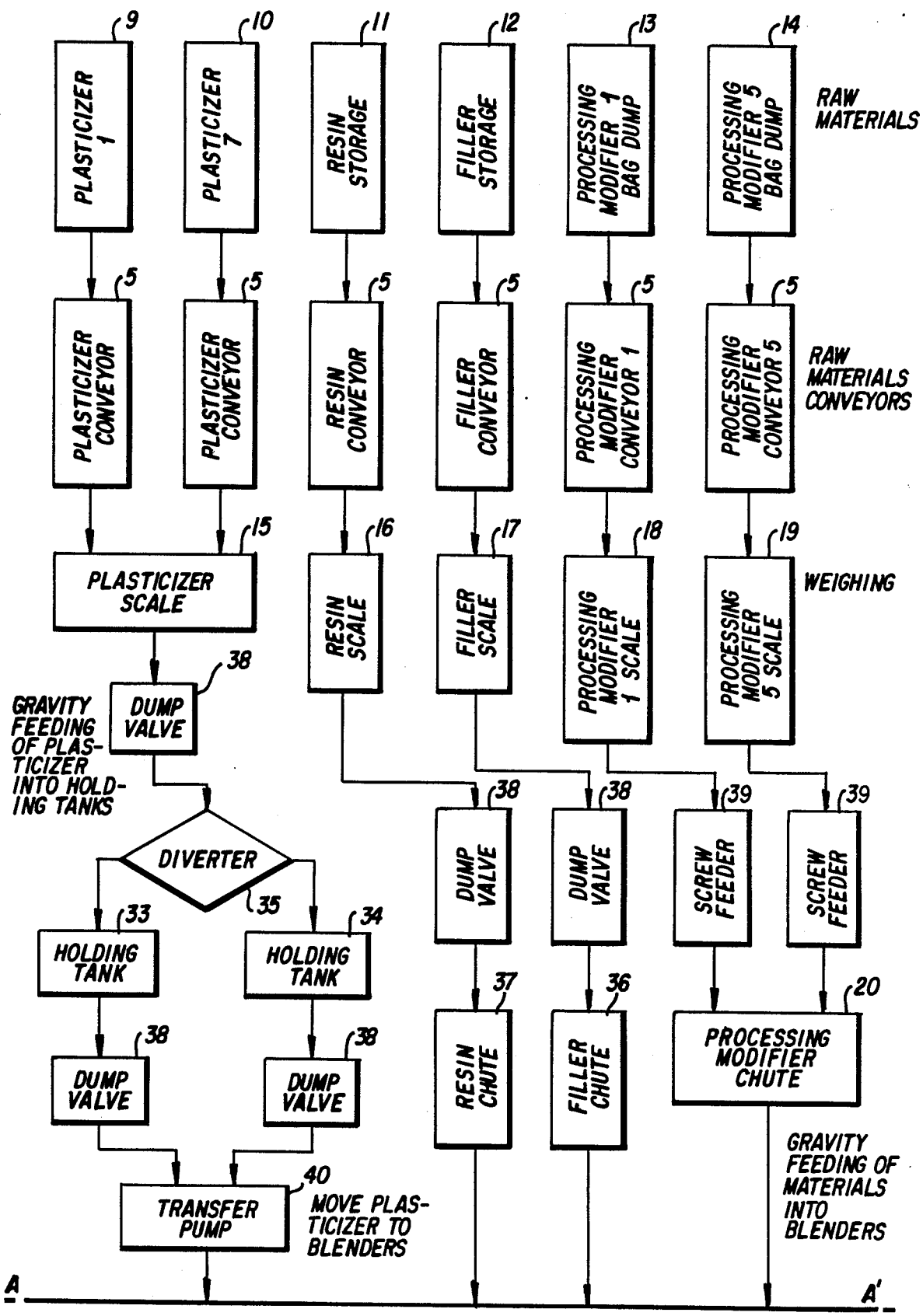
FIG. 3 is a schematic block diagram of the PVC insulation manufacturing system at Southwire Corporation, of which items 1–26, 33, 34, 35, 36, 37, 38, 39, 40 are under the control of this invention.
Figure 3B:
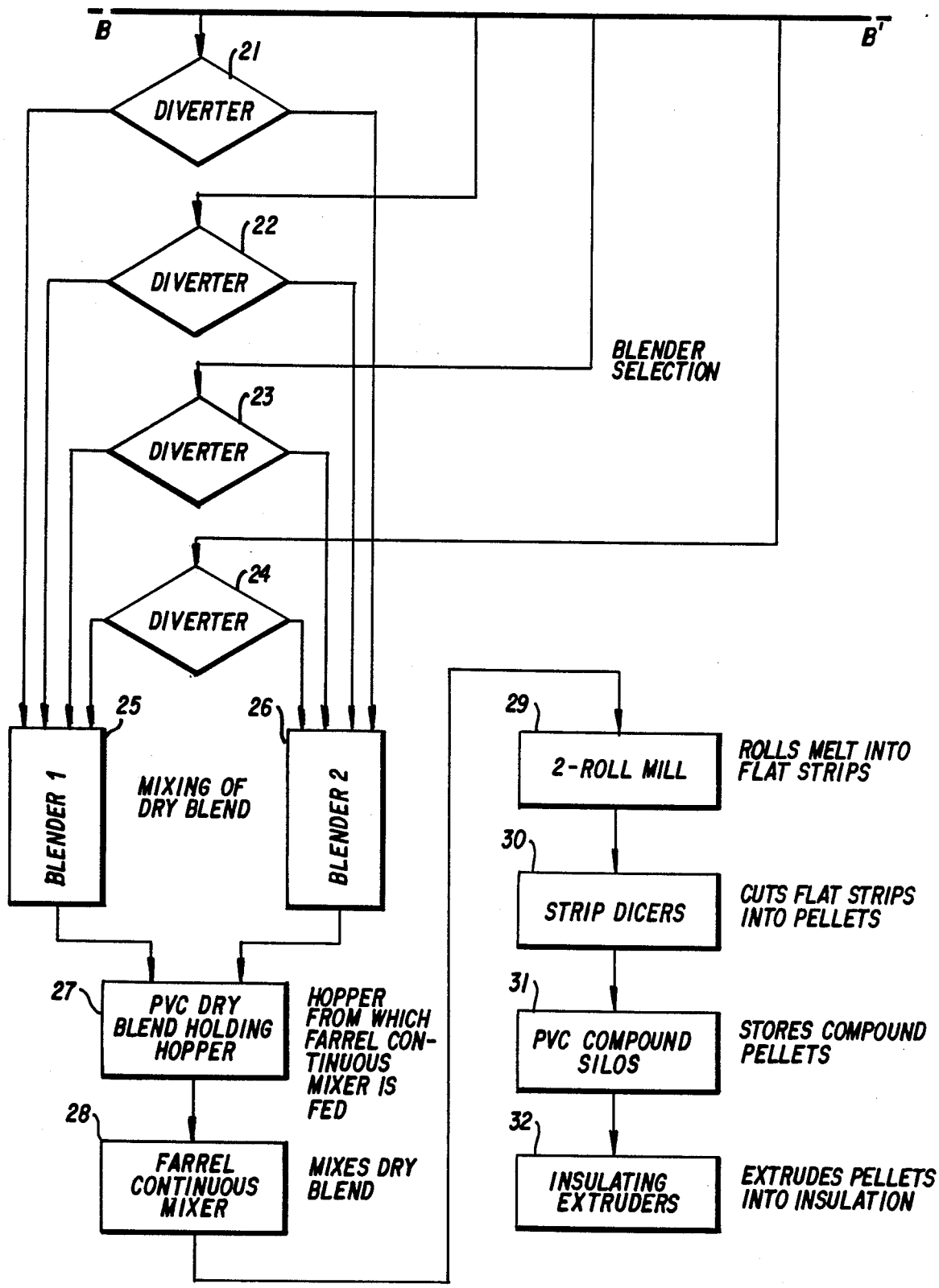
Figure 4:
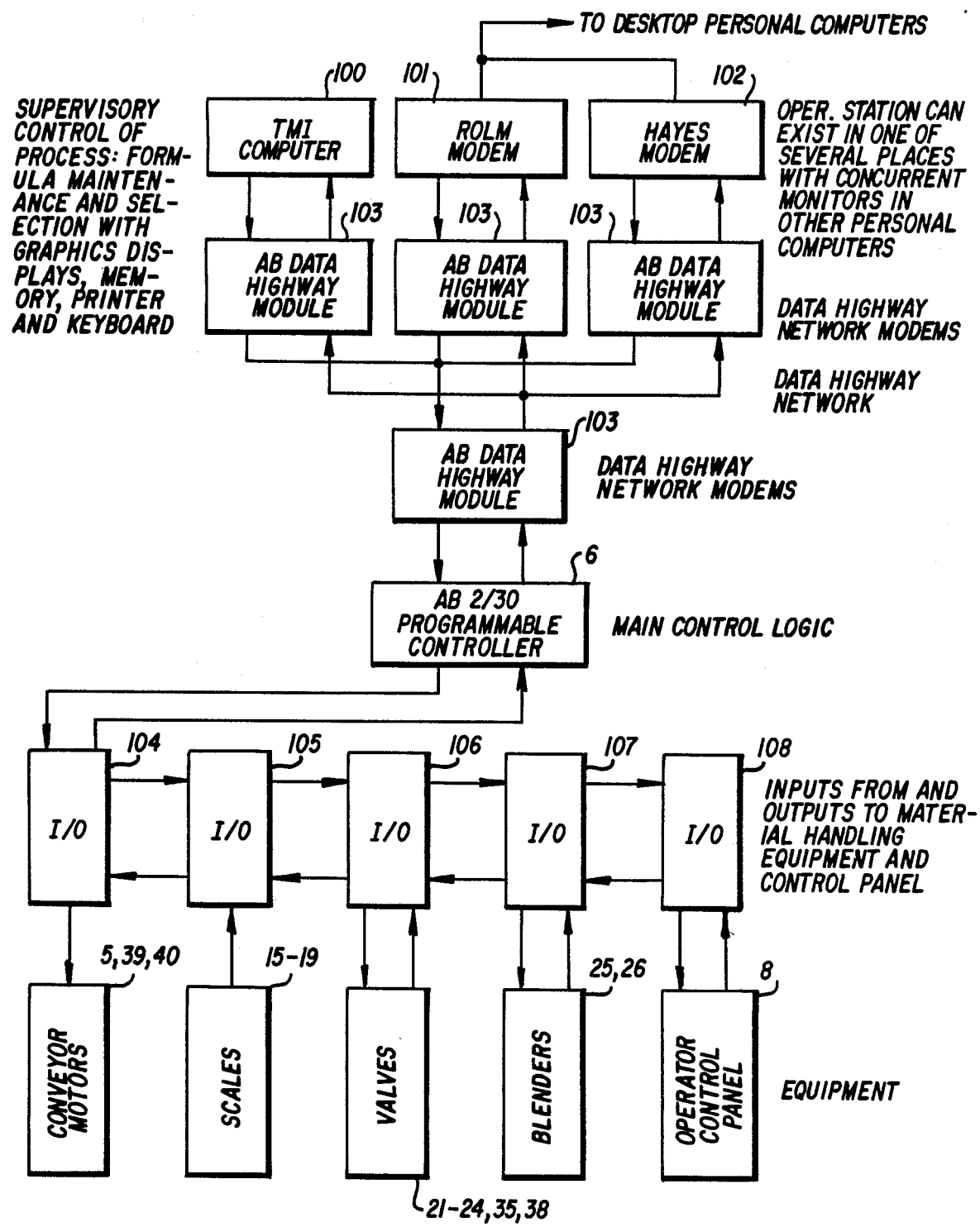
FIG. 4 is also a block diagram of the present invention illustrating the manner in which the computer and programmable controller interface with I/O devices and the process hardware, i.e., blenders, scales, valves, and motors, shown in FIG. 3.

The preferred embodiment of the present invention, shown in FIG. 4 of the drawings, is based on the use of a batching system to control and monitor the feeding of ingredients from 14 storage bins, bearing reference numerals (in FIG. 3) 9–14, to scales 15–19. Each of the 14 bins contains raw materials. The first seven bins 9,10 feed into scale 15 plasticizers whose basic constituent ingredients are large molecule alcohols, such as diisodecyl phthalate, ditridecyl phthalate, triisononyl trimellitate, undecyl dodecyl phthalate, dissodecyl phthalate hydrocarbon type extruder mixed, and mixed normal alkyl phthalate. The eighth bin 11 contains a PVC resin and feeds this resin into scale 16. The ninth bin 12 stores two fillers, namely, atomite and clay, and transmits these two ingredients to scale 17. The last five bins 13,14 store the processing modifiers, i.e., stabilizer modified basic lead sulfate organic complex, stabilizer dibasic lead phthalte, bisphenol-A (preblended with either the first two or third and fourth alcohols above), antimony trioxide, and stearic acid. The raw materials are fed to the scales via conveyor motors 5. The scales are utilized to weigh a predetermined amount of raw materials. When that predetermined amount is reached, the raw materials contained in the scales are funneled through four diverter valves, one for the plasticizer raw material, one for the resin material, one for the filler material, and the fourth for the processing modifier material. Prior to entering the first diverter valve 21, the plasticizer is emptied from scale 15 into two holding tanks 33,34 through a dump valve 38 and diverter valve 35. From the holding tanks, the plasticizer material is sent to two dump valves 38 and transfer pump 40 before it enters the first diverter valve 21. Prior to entering the fourth diverter valve 24, the processing modifier material is passed through a processing modifier chute 20 through the use of two screw feeders 39. Prior to entering the second diverter valve 22, the resin material is dumped from scale 16 into valve 38 and chute 37. Prior to entering the third diverter valve 23, the filler material is dumped from scale 17 into valve 38 and chute 36. The four diverter valves funnel the raw material into two blenders 25,26 which mix the dry blend of material. The output of the two blenders is sent to a hopper 27 which then transmits the material to a Farrell continuous mixer 28, which mixes the dry blend. The mixer 28 then conveys the mixed material to a two-roll mill 29 which rolls the melted material into flat strips. From the two-roll mill, the strips are then transmitted to strip dicers 30 which cut the flat strips into pellets. The output of the dicers is sent to PVC compound silos 31, which store the compound pellets. The last step of the process is the actual forming of the insulation around the metallic wire. In this step, the insulating extruders 32 receive the pellets and extrude them into insulation material around the wire needing to be insulated.

FIG. 4 is a schematic diagram showing the manner in which the computer, programmable controller and I/O devices interface and control the various sections of the PVC batching system process. FIG. 4 shows a Texas Microcontroller Inc. (TMI) computer 100 which transmits and receives data from an Allen-Bradley 2-30 programmable controller 6 over four Allen-Bradley data highway modules 103. Attached to these modules 103 are two modems, a Rolm Modem 101 and a Hayes Modem 102, which are connected to desk top personal computers not shown. The TMI computer system 100 contains a keyboard to enter data, a memory to store data, a processor to manipulate and change data, a graphics monitor to display information, and a printer to record the data. The programmable controller 6 transmits data to five (5) I/O devices 104,105,106,107,108 for material handling equipment. Each I/O device transmits to and receives data from the 2/30 controller. Each I/O rack contains numerous I/O modules which, in general, connect to the material handling equipment as follows. The first I/O rack 104 transmits data to the two blenders 25,26 shown in FIG. 4. The scales 15-19 provide data to the second I/O device 105. The third I/O rack 106 is used to receive from and transmit data to the diverter valves 21-24 shown in FIG. 3. The fourth I/O rack 107 receives from and transmits data to the conveyor motors 5 shown in FIG. 3, and other control valves not shown. The fifth I/O rack 108 receives from and transmits data to an operator control panel 8. While the programmable controller issues instructions to the blenders 25, 26, valves 21-24, conveyor motors 5, etc., the computer 100 verifies from the scales that the correct ingredient weight has been obtained, and if not obtained, the computer directs an operator to correct the ingredient weight or reject the entire load through a reject chute not shown.

Figure 5:
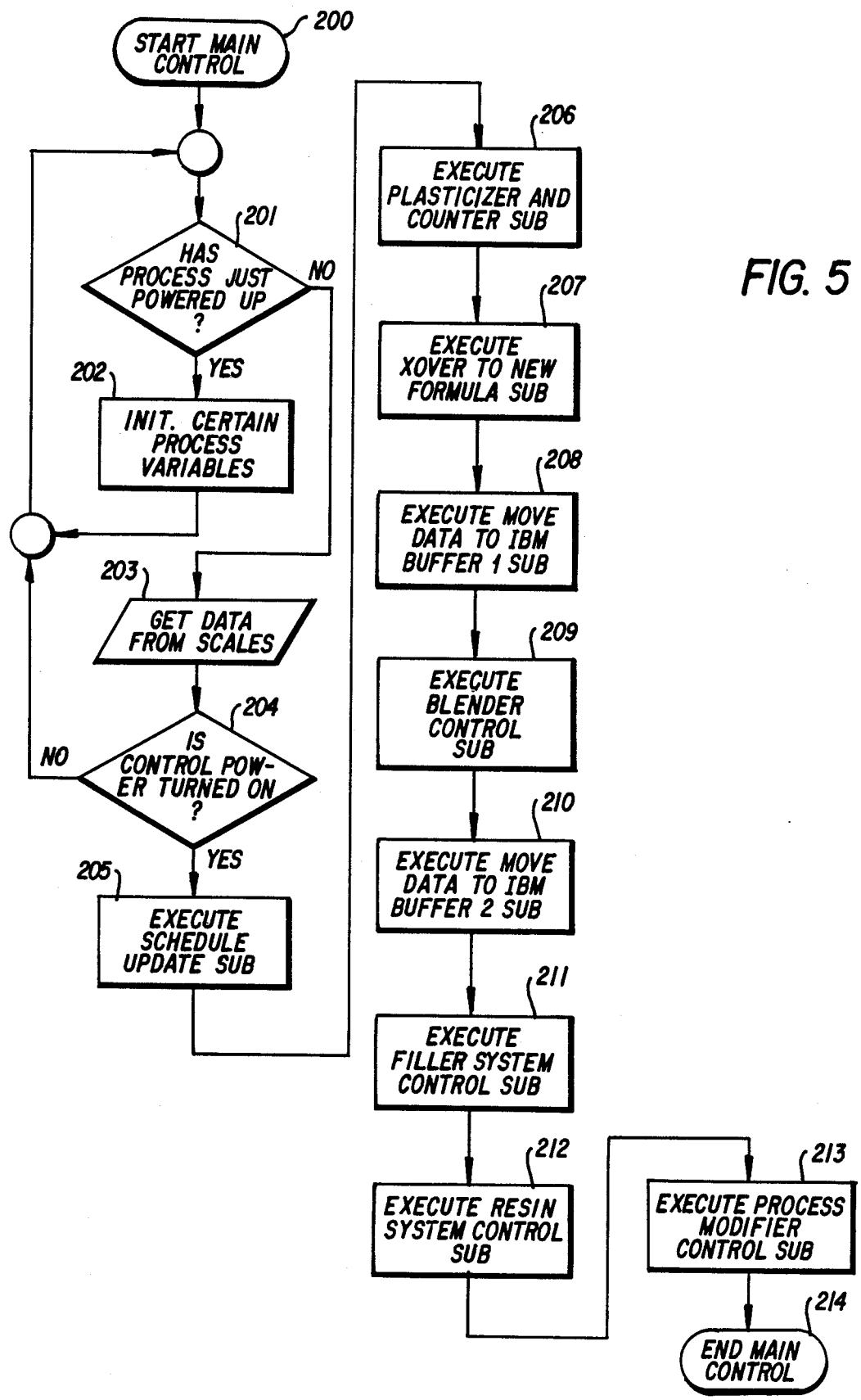
FIG. 5 is a logic flow diagram for the present PVC batch control main program.

Main Program (FIG. 5)

The main program performed by the computer and/or programmer controller is described with reference to FIG. 5, which is a flow diagram of the PVC batch control process. The main control is initiated in block 200 by turning a key switch on the 2/30 processor. The program continues to block 201 where it is determined whether the process has just powered up. If the answer is affirmative, the process variables, such as scale input flags, blender steppers, and analog input modules, are initialized, and the program returns to answer the same question until the answer is negative, at which time data is obtained from scales 15-19 as noted in block 203. After data from the scales is obtained, program control shifts to block 204 to determine whether the control power is turned on. If the answer is affirmative, the program continues to block 205 where a schedule update subroutine is executed. See FIG. 6. If the answer is negative, program control returns to the start of the main program. Following the execution of the schedule update subroutine, the program executes a plasticizer and counter subroutine noted in block 206, a changeover to a new formula subroutine noted in block 207, a data movement to the IBM buffer No. 1 subroutine per block 208, a blender control subroutine per block 209, a movement of data to the IBM buffer No. 2 subroutine noted in block 210, a filler system control subroutine noted in block 211, a resin system control subroutine per block 212, and a process modifier control subroutine noted in block 213. See FIGS. 7-14 for subroutines. The main program ends in block 214.

Figures 6, 7, 8:
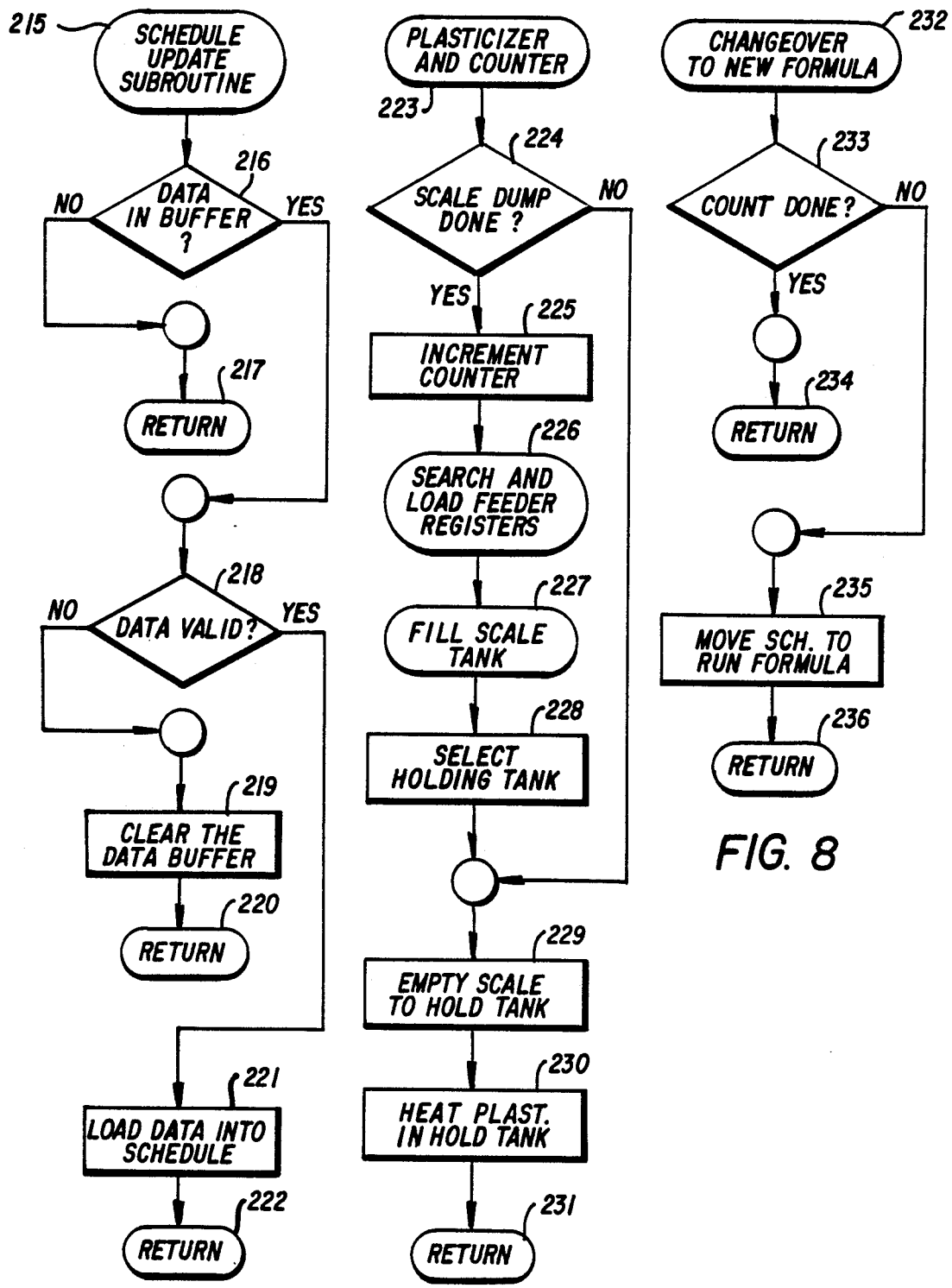

Schedule Update Subroutine (FIG. 6)

FIGS. 6-43 illustrate a program and the support routines for the main PVC program depicted in FIG. 5. FIG. 6 is a logic flow diagram for the schedule update subroutine noted in block 205. This subroutine verifies that a scheduled formula is appropriate. The subroutine begins in block 215. Then, the subroutine continues by ascertaining per block 216 whether the data is contained in the program controller buffer. If the data is not there, the subroutine returns, per block 217, to the main program. If it is in the buffer, then the program determines from block 218 whether the data is valid. If valid, the data (formula number and number of batches of next scheduled run) is loaded into the schedule and the subroutine returns to the main program per blocks 221,222. If the data is not valid, then the data buffer is cleared and the program returns to the main program per blocks 219,220.

Plasticizer Subroutine (FIG. 7)

The plasticizer and counter subroutine referred to in the FIG. 5 main program in block 206 is shown by the logic flow diagram of FIG. 7 beginning at block 223. The plasticizer subroutine at block 224 determines whether all material in scale 15 has been emptied. This step therefore initializes the plasticizer section of the program. If the scale 15 has been emptied, the counter is incremented at block 225, a search is performed, and the feeder registers are loaded per block 226. Then, the scale 15 is filled per block 227, and the holding tank for the plasticizer is selected per block 228. If the scale was not empty, then the material in the scale is emptied into one of the two holding tanks per block 229. In the holding tank, the plasticizer is heated per block 230 and control of the program is returned to the main program per block 231.

Changeover to New Formula Subroutine (FIG. 8)

FIG. 8 is a logic flow diagram of a subroutine referred to in FIG. 5, block 207 and entitled changeover to new formula which starts at block 232. In that subroutine it is determined in block 233 whether a count (number of batches run on last formula) has been completed. If not, the subroutine returns to the main program per block 234. If the answer is yes, the schedule is moved to run the new formula per block 235 and program control returns to the main program in FIG. 5.

The actual formula run with this invention forms no part of the invention. Different formulas exist for the manufacture of the desired insulation, and they depend on customer specification. The invention illustrates the manner in which any formula or plurality of formulas may be introduced into the apparatus and process which form the present invention.

Data Buffer Subroutine (FIG. 9)

The next subroutine referred to in the main program is shown in FIG. 9 as moving the data to an TMI buffer No. 1 referenced in block 237. The subroutine begins by moving the data in block 238 to a buffer and then returning control to the main program as noted in block 239.

Blender Subroutine (FIG. 10)

The logic flow diagram illustrated in FIG. 10 contains the blender control subroutine referred to in block 209 of the main program shown in FIG. 5. This subroutine begins in block 240 and determines whether the blender is empty as noted in block 241. If the answer is yes, then a new batch formula is loaded per block 242 and flags are set to call other subroutines per block 243. If the answer is no, then the loading of a new batch formula is not performed and flags are set to call other subroutines per block 243. Once the flags are set, blender 1 and 2 material loading subroutines are called as noted in blocks 244 and 245. Then the flags are reset in block 246; the required outputs (panel lamps, valves, motor starters) are enabled in block 247; and the program control returns to the main program, FIG. 5, as shown in block 248.

Data Buffer Subroutine (FIG. 11)

FIG. 11 is similar to FIG. 9 and depicts a logic flow diagram of a movement of data to an TMI buffer No. 2 subroutine as shown in block 249. In this subroutine, the data is moved to service a graphics display routine in the TMI computer per block 250, and program control is returned to the main program as noted in block 251.

Filler Subroutine (FIG. 12)

A flow diagram of the filler control subroutine referred to in FIG. 5, block 211 is shown in FIG. 12 beginning at block 252. In this subroutine, it is determined whether the filler material in scale 17 is emptied as shown in block 253. If yes, then new filler setpoints are loaded in the program and the blower is started per blocks 254 and 255. If not, the new filler setpoints are not loaded, and the blower is started as shown in block 255. A bag house control subroutine is then performed per block 256, which cleans the filters on top of scale 17, and a steady condition is then achieved as noted in block 257. The filler 1 setpoint and dribble are then calculated per blocks 258 and 259. The next step in this subroutine is load filler 1, per block 260, then calculate the filler 2 setpoint per block 261. Then, calculate the filler 2 material, per block 262, load filler 2, per block 263, and lastly dump the filler into the blender, per block 264. This subroutine then returns control to the main program as shown in block 265.

Resin Subroutine (FIG. 13)

A logic flow diagram of the resin control subroutine referred to in FIG. 5 block 212 is illustrated in FIG. 13. The subroutine starts at block 266. A blower is started as shown in block 267, and a bag house control (as described in reference to block 256) is enabled per block 268 which cleans the filters on top of scale 16. Following that step, the resin is loaded as noted in block 269; the resin setpoint is obtained as shown in block 270; a let down point is calculated per block 271; and the resin is emptied from scale 16 into the blender as illustrated in block 272. This subroutine then returns control to the main program as shown in block 273.

Modifier Subroutine (FIG. 14)

FIG. 14 is a logic flow diagram of the modifier control subroutine 274 referred to in block 213 of FIG. 5. In this subroutine, five control subroutines are called in blocks 275, 276, 277, 278, and 279. These subroutines are contained in FIGS. 21–25. Following these subroutines, a discharge chute is then operated as shown in block 280 whereby the modifier material is sent from scales 18,19 to diverter valve 24. This subroutine then returns control to the main program as noted in block 281.

Figure 15:
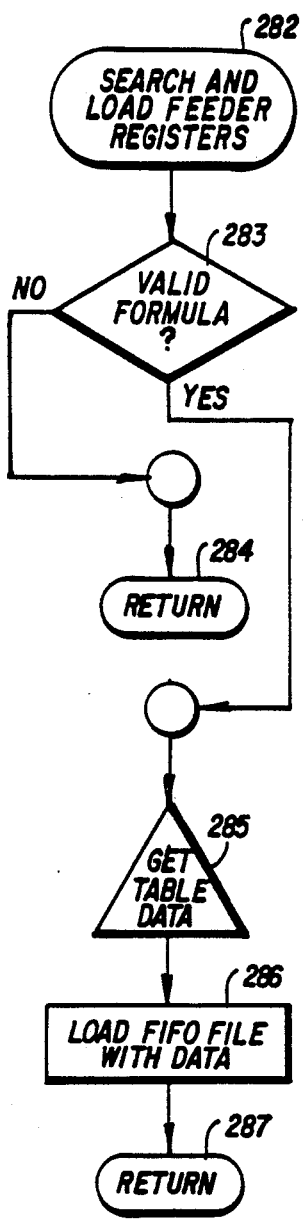

Search and Load Register Subroutine (FIG. 15)

Figure 16:
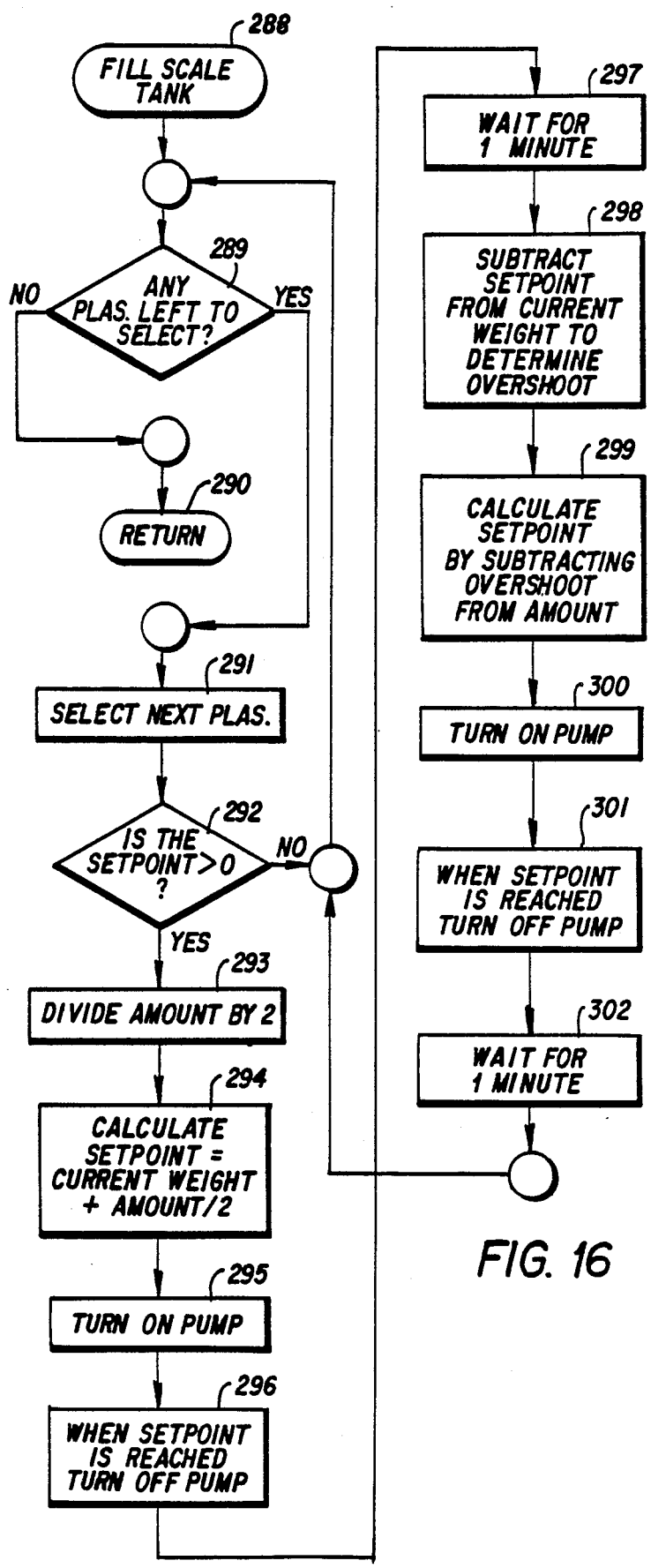

FIGS. 15 and 16 amplify more fully the plasticizer and counter subroutine shown in FIG. 7, blocks 223,227. It should be noted that the plasticizer and filler scales have no ingredients in them at the start of the process, but instead obtain ingredients during the process. In FIGS. 15 and 16 the routine steps are legended in abbreviated form and are listed more fully below.

282: Search and load the feeder registers.
283: Is there a valid formula in the feeder file?
285: If a valid formula is located, then get the data (formula setpoints) located in the memory table.
286: Load the first in, first out (FiFo) file (stack in programmable controller) with said data.
287: Return to the subroutine shown in FIG. 7.
284: If the formula is not valid in block 283, then return to the subroutine shown in FIG. 7.

Fill Scale Tank Subroutine (FIG. 16)

288: Fill the scale tank subroutine.
289: Is there any plasticizer left to select?
290: If not, then return to subroutine shown in FIG. 7.
291: If there is plasticizer left to select, then select the next plasticizer.
292: Is the plasticizer first setpoint greater than zero?If not, then return to step 289.
293: If yes, then divide the amount of the plasticizer first setpoint by two.
294: Calculate a second setpoint to equal the current weight, plus the first setpoint amount divided by two.
295: Turn on the pump.
296: When the second setpoint is reached, turn off the pump.

297: Wait for one minute.

298: Subtract the second setpoint from the new current weight to determine the overshoot of the plasticizer amount.

299: Calculate a third setpoint by subtracting the overshoot amount from the first setpoint plasticizer amount, and adding the current weight in 294.

300: Turn on the pump.

301: When the third setpoint is reached, turn off the pump.

302: Wait for one minute and then return to step 289.

Figure 17A:
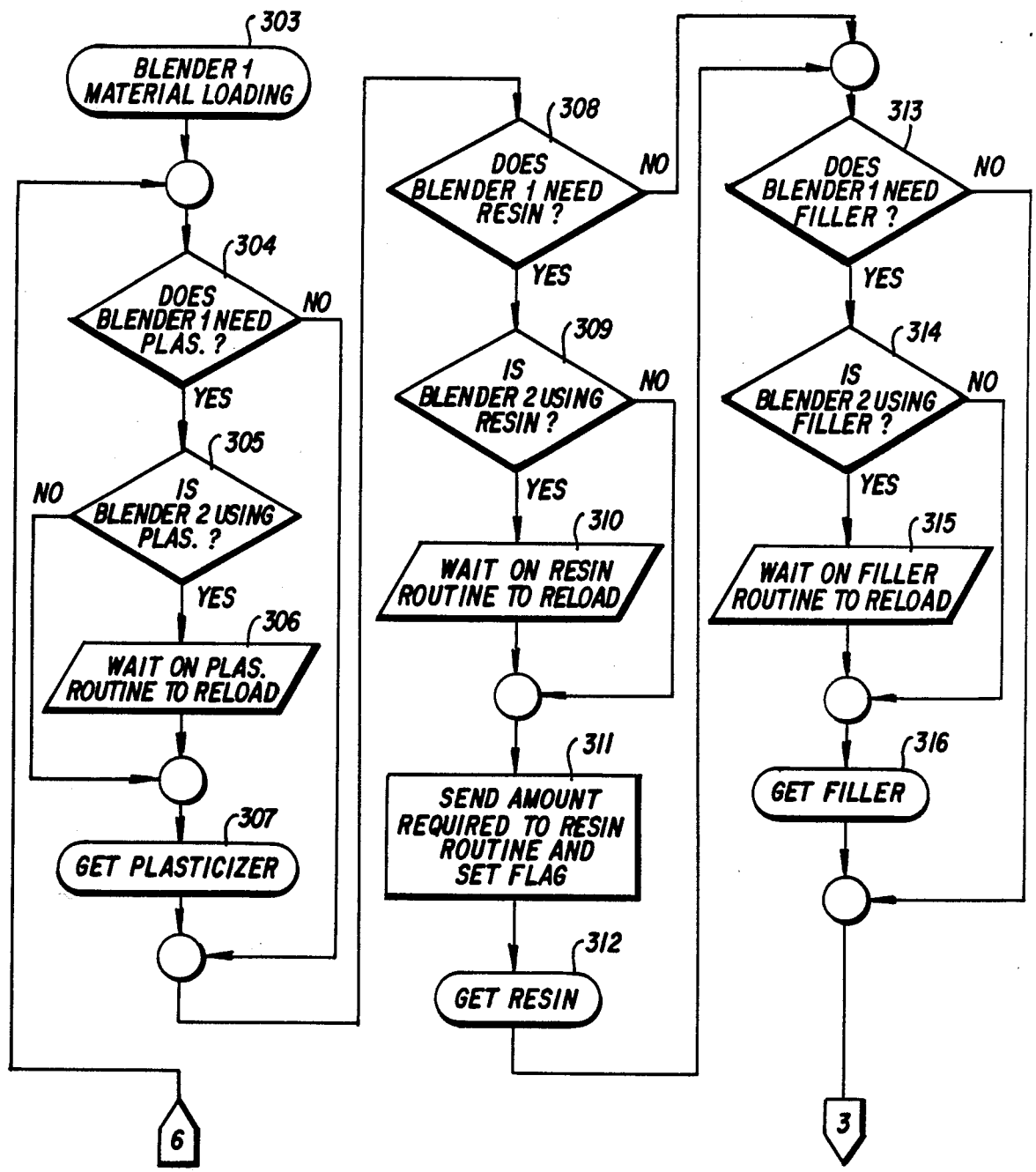
Figure 17B:
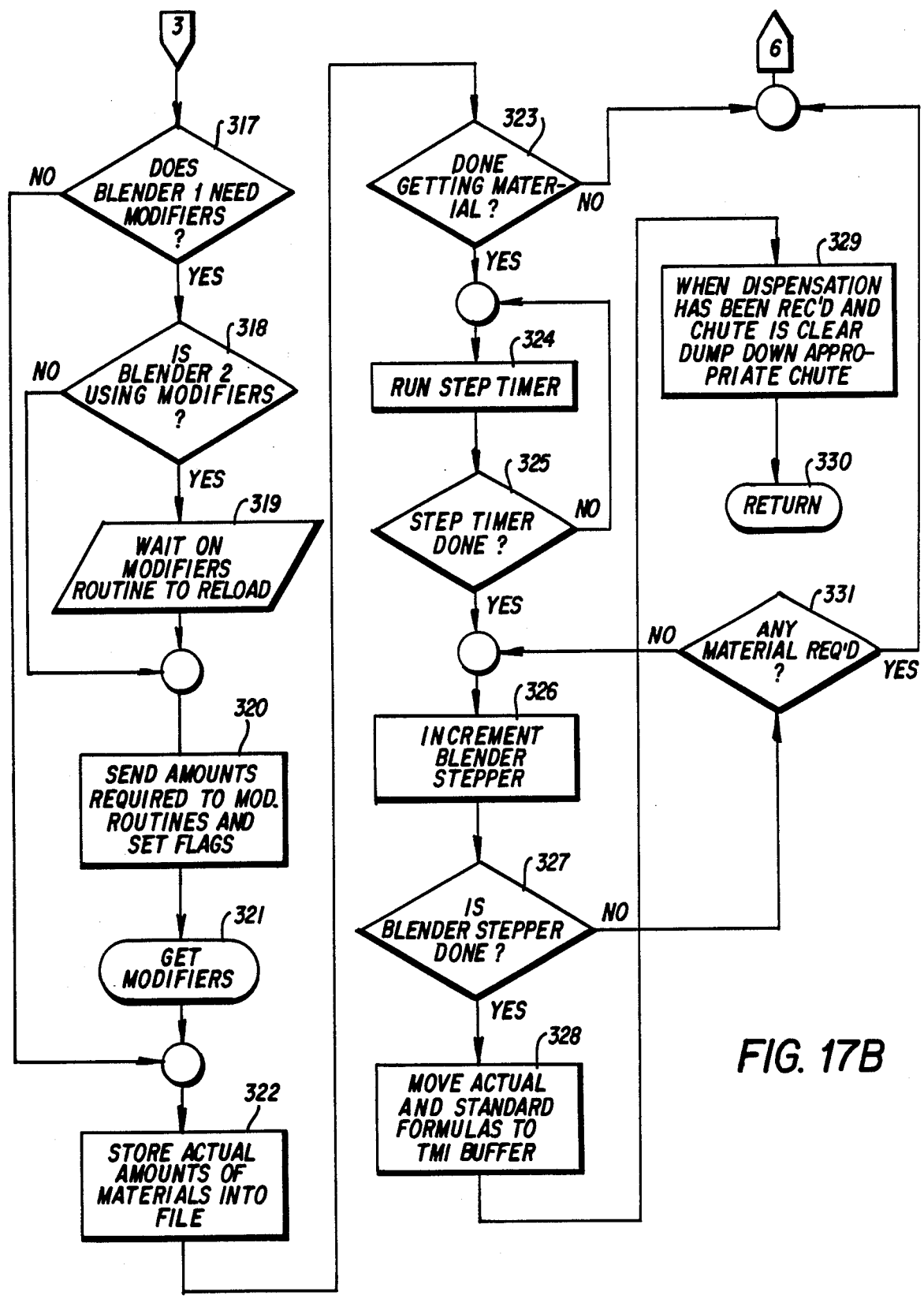
Figure 19A:
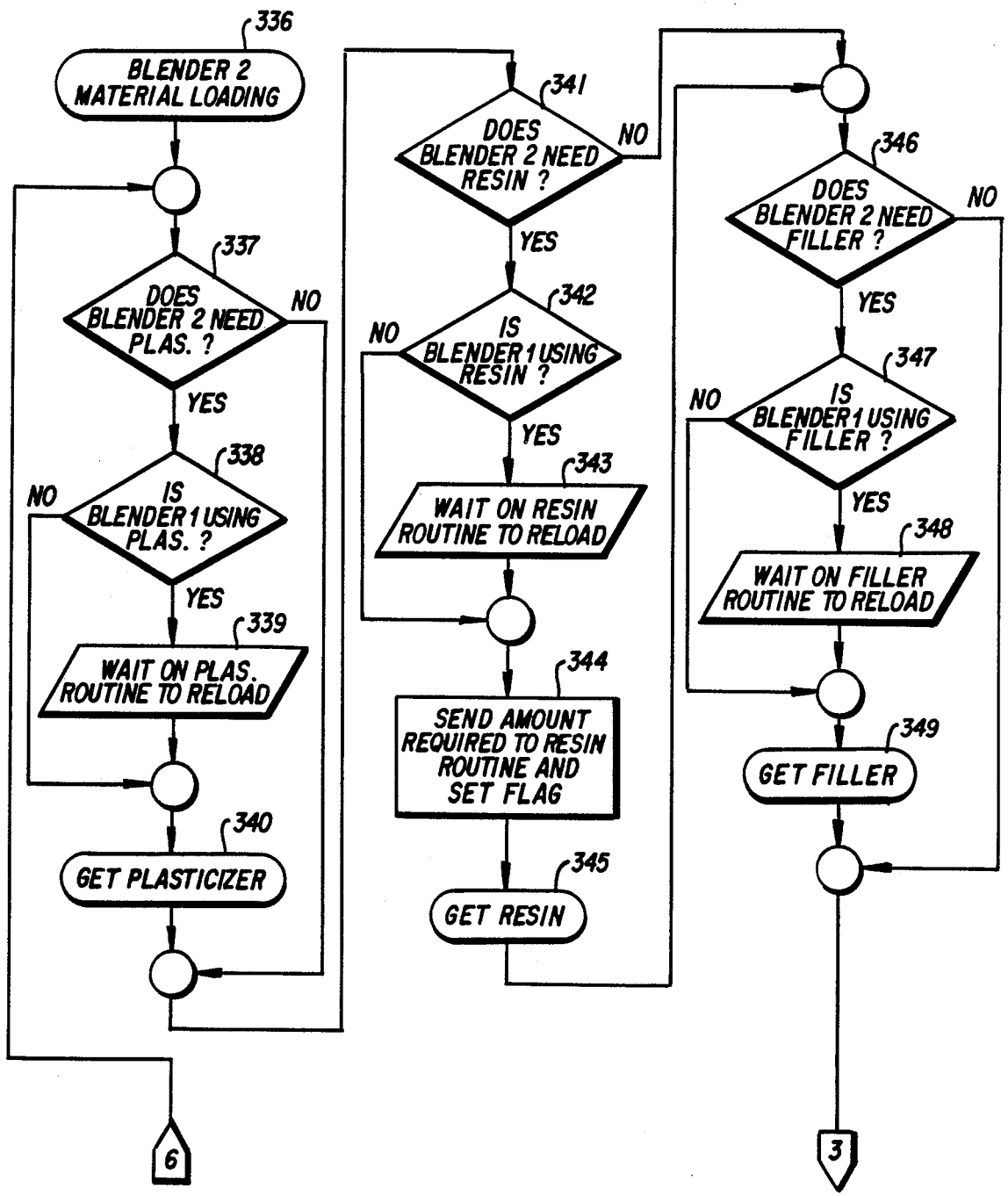
Figure 19B:
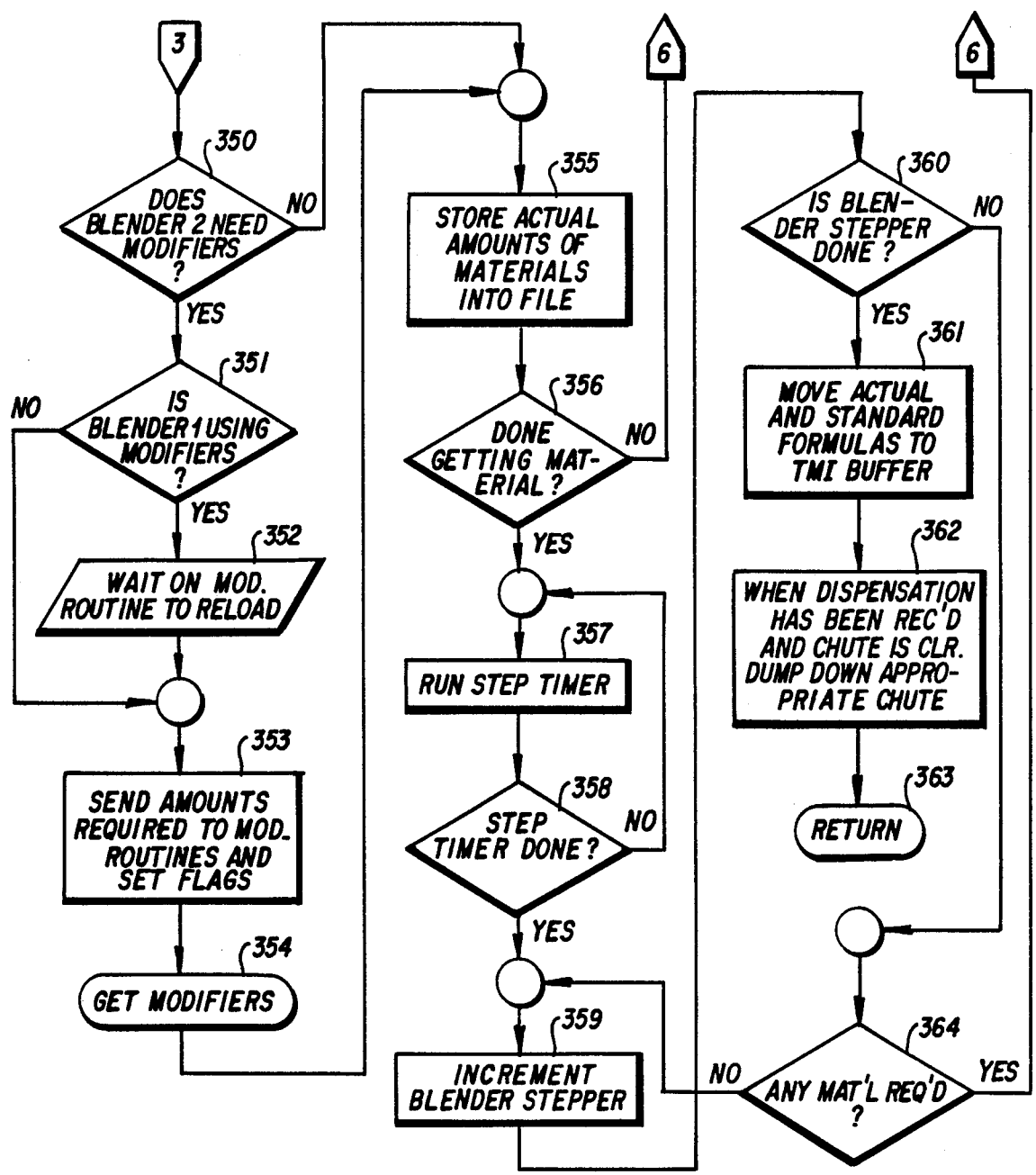

Blender Material Loading Subroutine (FIGS. 17 and 19)

FIGS. 17 and 19 amplify more fully the blender material loading subroutines referred to in FIG. 10 blocks 244,245. FIGS. 17 and 19 are exactly the same, except that each program controls a specified blender (1 or 2) and refers to the other blender as will be explained more fully below. Certain of the routine steps are legended in abbreviated form and are listed more fully below.

303 & 336: This is the blender material loading subroutines.

304 & 337: Does the specified blender need plasticizer in its current step?

305 & 338: If yes, is the other blender using plasticizer?

306 & 339: If yes, wait on the plasticizer routine to reload.

307 & 340: Get plasticizer. If the other blender is not using plasticizer per block 305, then also get the plasticizer.

308 & 341 If the specified blender does not need plasticizer, then does the specified blender need resin in its current step?

309 & 342: If the answer is yes, is the other blender using resin?

310 & 343: If the answer is yes, wait on the resin routine to reload the specified blender.

311 & 344: If the other blender is not using resin, then send the amount of the resin required to the resin routine and set a flag.

312 & 345: Get the resin.

313 & 346: If the blender does not need resin, does the blender need filler in its current step?

314 & 347: If the blender does need filler, is the other blender using filler?

315 & 348: If the other blender is using filler, wait on the filler routine to reload the specified blender.

316 & 349: Get filler material. If the other blender is not using filler, then also get filler material.

317 & 350: If the specified blender does not need filler, then does the specified blender need modifiers in its current step?

318 & 351: If the answer is yes, is the other blender using modifiers?

319 & 352: If the answer is yes, wait on the modifier routine to reload the specified blender.

320 & 353, If the other blender is not using modifier, send the required amount of modifiers to modifier subroutines and set flags.

321 & 354: Get modifiers.

322 & 355: Store the actual amounts of all materials into a file.

323 & 356: Has the system finished getting material?

324 & 357: If the answer is yes, run the step timer.

325 & 358: Is the step timer done? If it is not, then complete running the step timer. If the step timer is done, then proceed to the next step.

326 & 359: Increment the blender stepper.

327 & 360: Is the blender stepper done?

328 & 361: If the blender stepper is done, then move the actual and standard formulas to the computer buffer.

329 & 362: When dispensation of the blender load from the TMI computer has been recieved and the chute is clear, dump the material down the appropriate chute.

330 & 363: Return control to the subroutine in FIG. 10.

331 & 364: If the blender stepper is not done, then is any material required? If not, increment the blender stepper as in step 326,359 and continue the subroutine. If more material is required, return control to the subroutine in FIG. 17.

Figure 18:
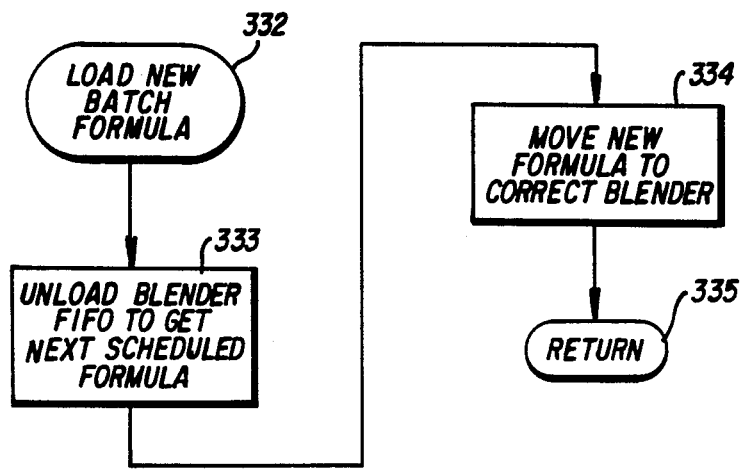

Load New Batch Formula Subroutine (FIG. 18)

FIG. 18 amplifies more fully the blender control subroutine referred to in FIG. 10 block 242. Certain of the routine steps are legended in abbreviated form and are listed more fully below also.

332: Load a new batch formula.

333: Unload the blender first in, first out buffer to get the next scheduled formula.

334: Move the new formula to the correct blender.

335: Return control to the subroutine in block 242.

Figures 20, 32:
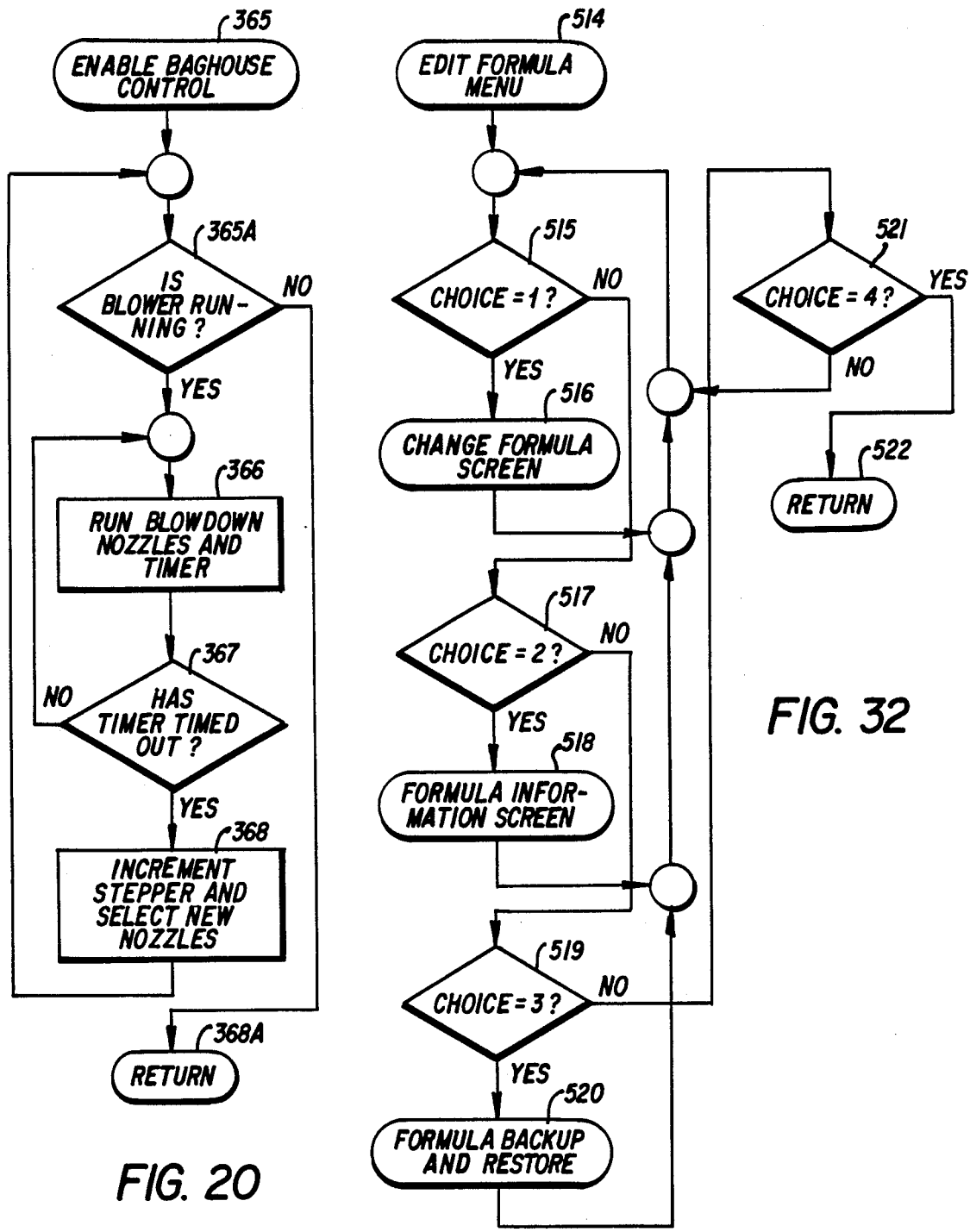
Figure 21:
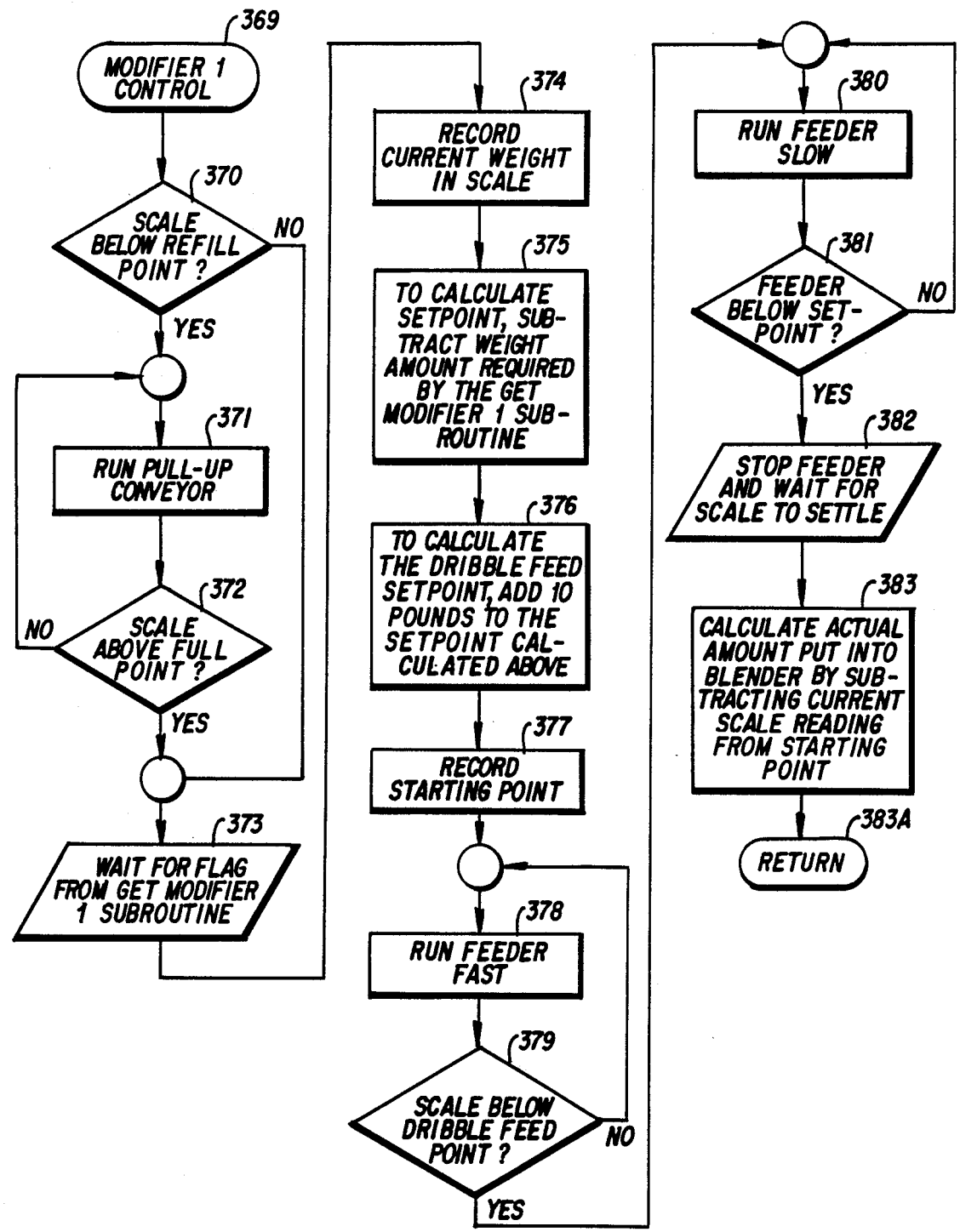
Figure 22:
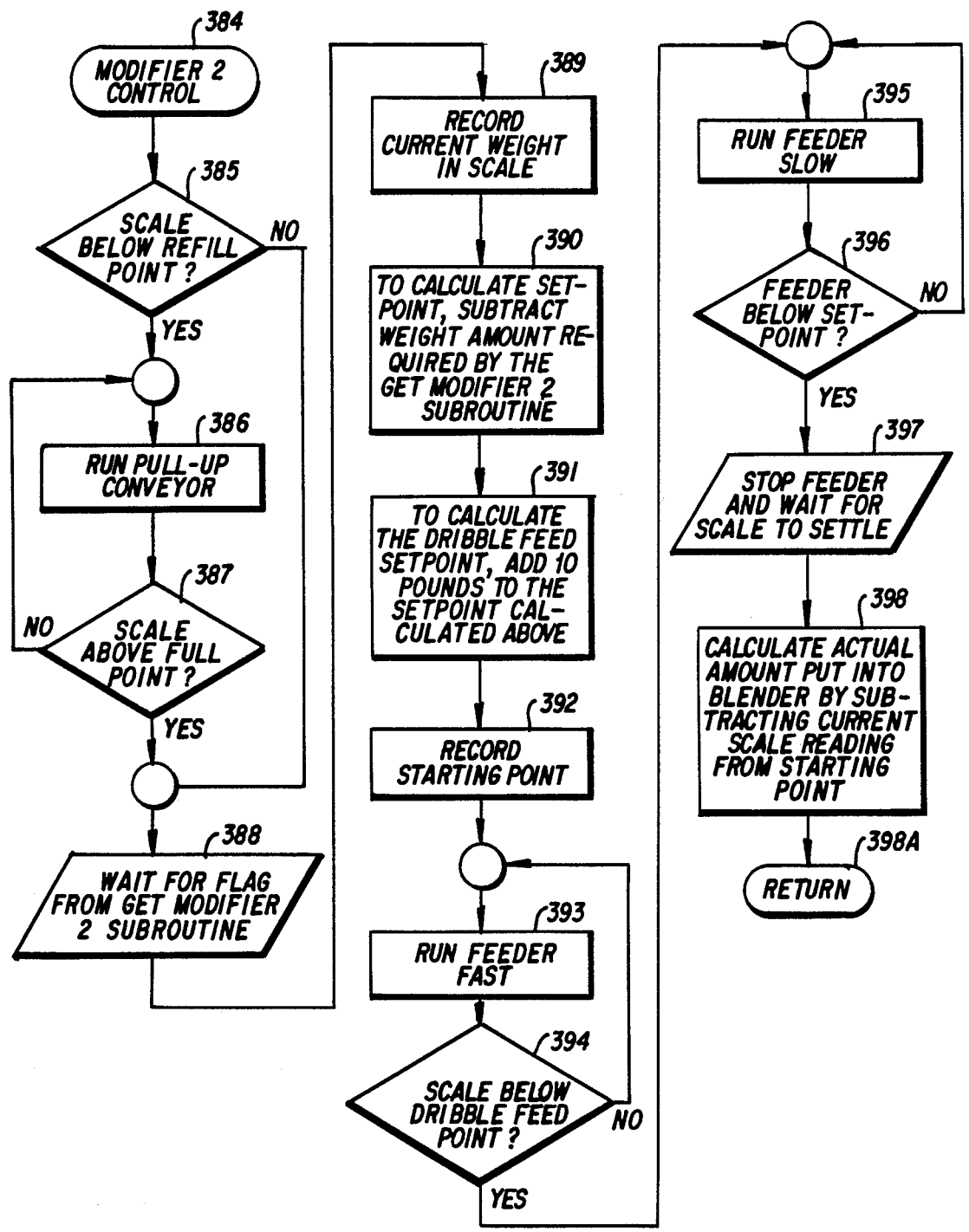
Figure 23:
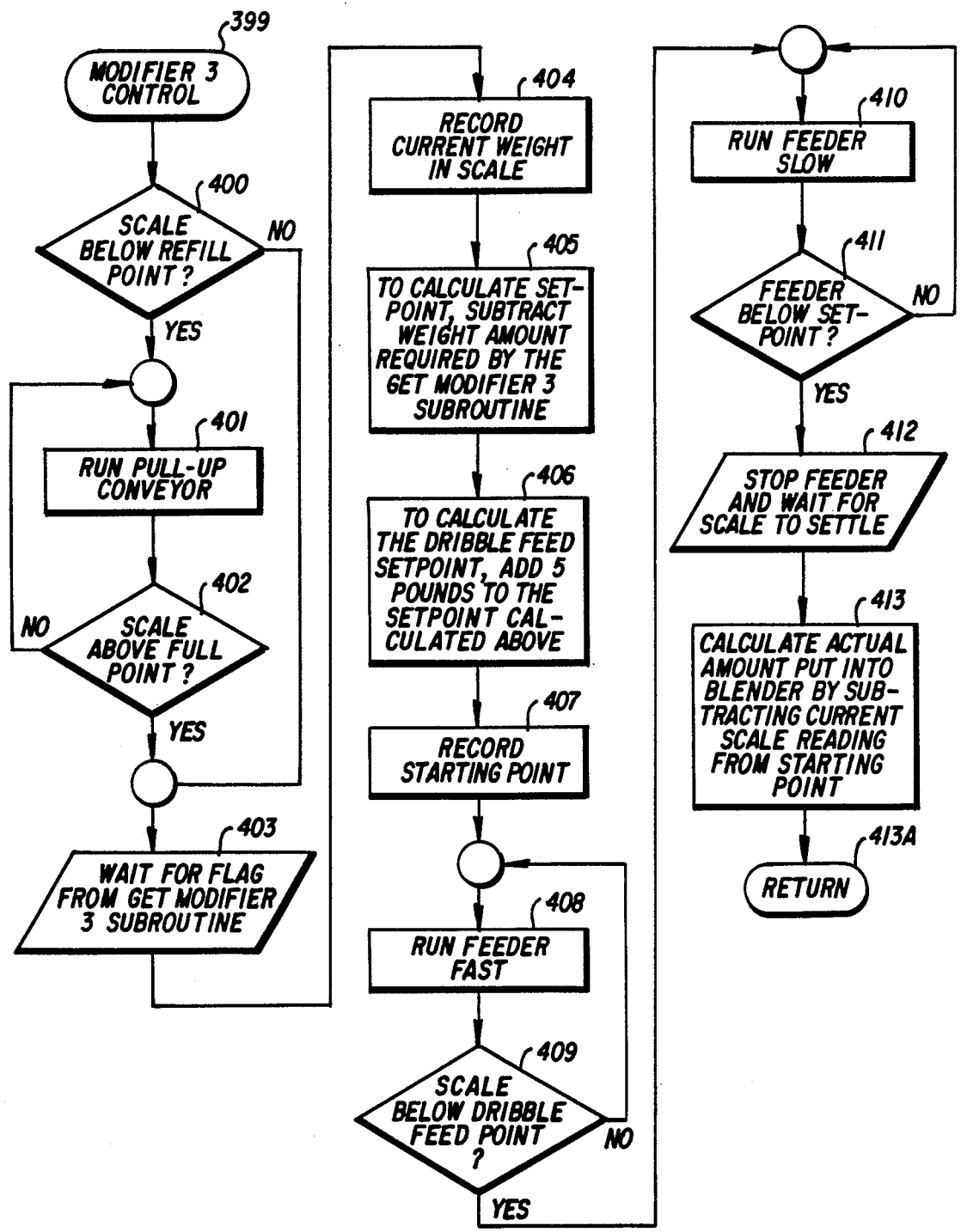
Figure 24:
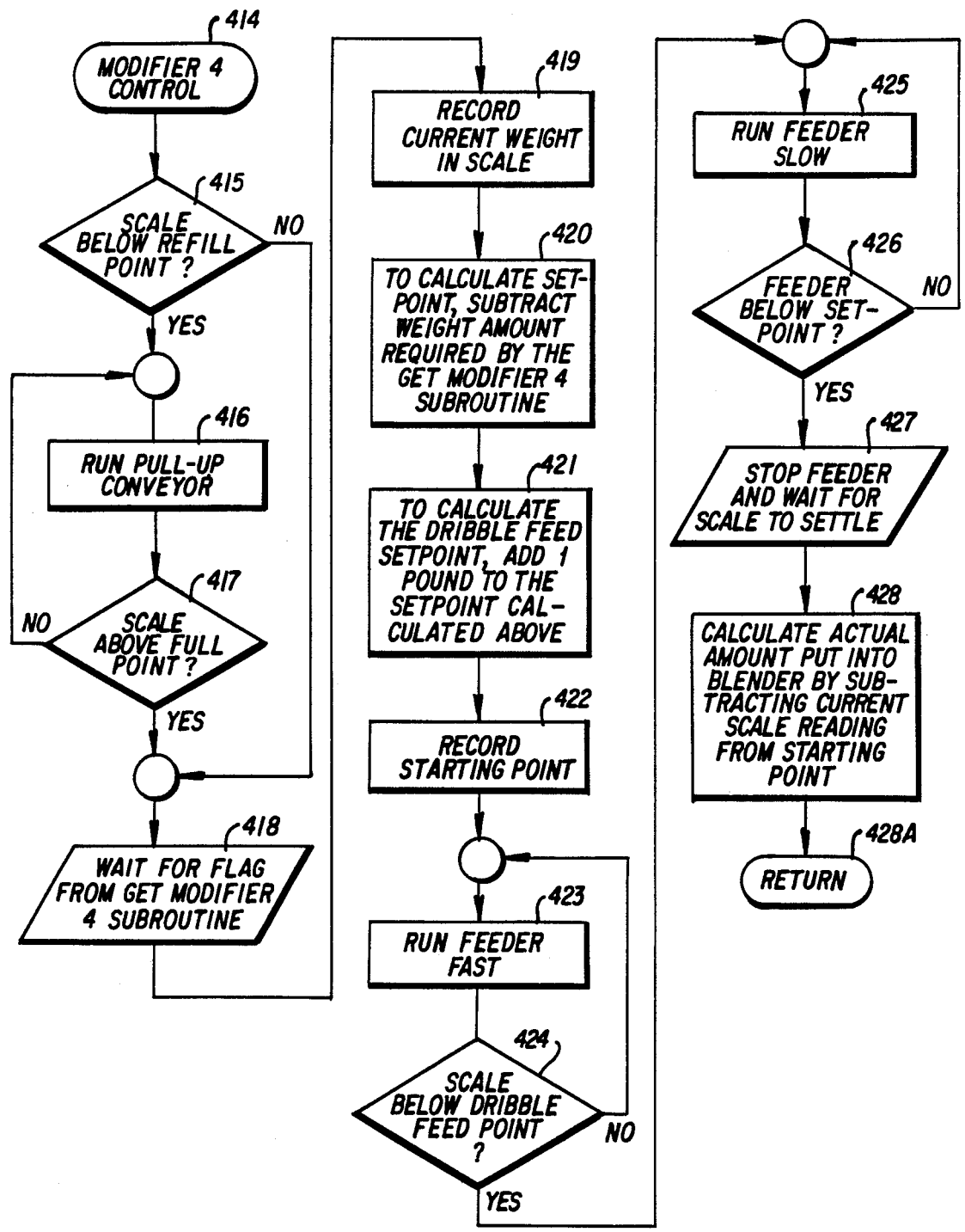
Figure 25:
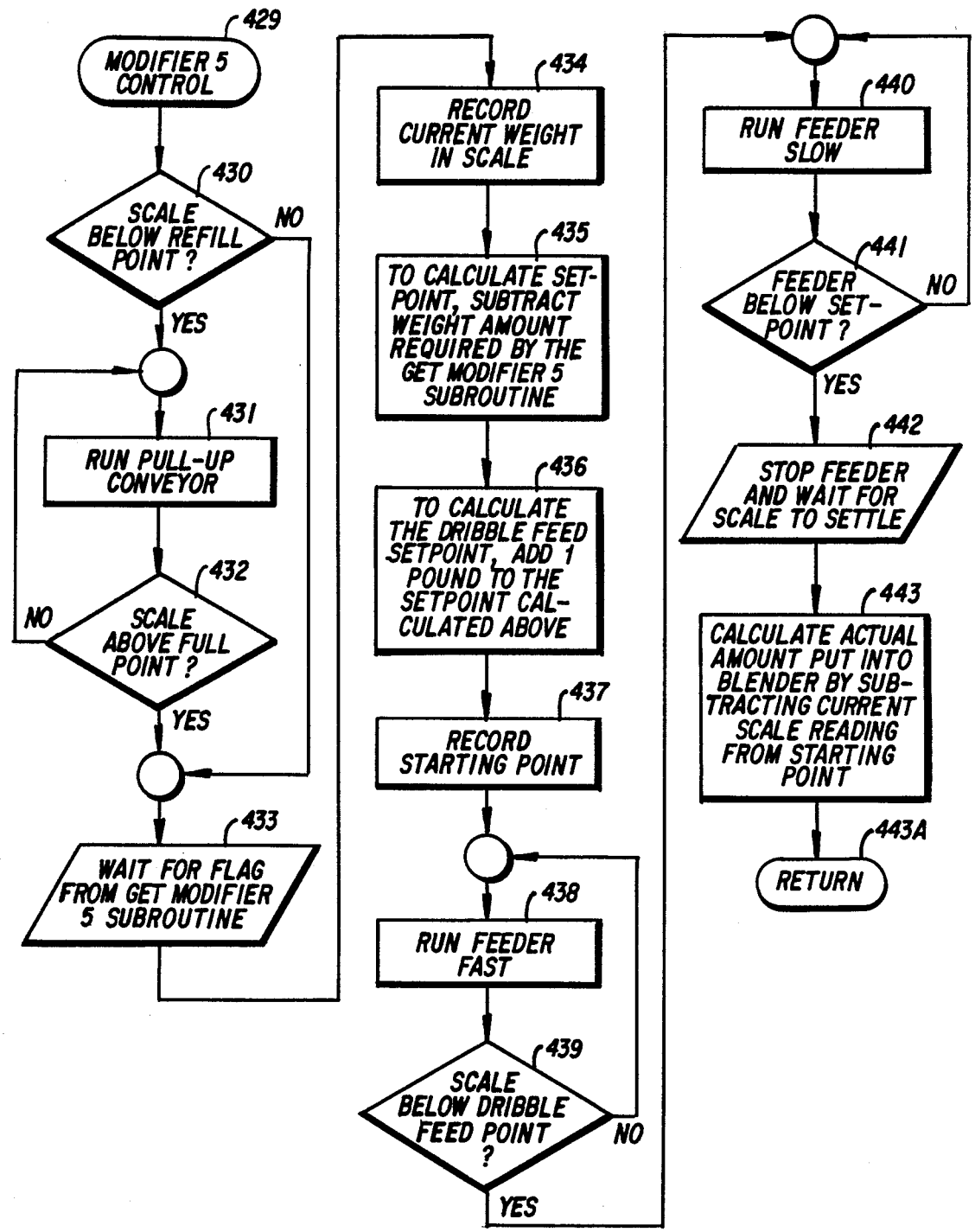

Enable Baghouse Control (FIG. 20)

FIG. 20 illustrates the subroutine entitled enable baghouse control referred to in FIGS. 12 and 13, blocks 256 and 268, respectively. This subroutine cleans the filters on top of the hopper 27. The routine steps are legended in abbreviated form and are listed more fully below.

365: This is the enable baghouse control subroutine.

365A: Is the filler blower running?

366: Run the blowdown nozzles and timers.

367: Has the timer timed out? If not, return to 366.

368: If yes, then increment the stepper and select new nozzles. Then shift to block 365A.

368A: Return to the subroutines shown in FIGS. 12 and 13, blocks 257 and 269 respectively.

Modifier Control Subroutines (FIGS. 21-25)

FIGS. 21-25 show more fully the modifier control subroutines referred to in FIG. 14, blocks 275-279. It should be noted that the modifier and resin scales are full at the start of the process and are replenished to their initial state after a drop of material into the blender. The routine steps are legended in abbreviated form and are listed more fully below.

369, 384, 399, 414 & 429: Modifier control subroutines.

370, 385, 400, 415 & 430: Is the scale below the refill point?

371, 386, 401, 416 & 431: If the answer is yes, run the pull-up conveyor.

372, 387, 402, 417 & 432: Is the scale above the full point? If not, run the pull-up conveyor

373, 388, 403, 418 & 433: If the scale is not at the refill point or if the scale is above the full point, then wait for a flag from the get modifier subroutine.

374, 389, 404, 419 & 434: Record the current weight of the modifier in the scale.

375, 390, 405, 420 & 435: To calculate the setpoint, subtract the required weight of the modifier requested by the blender from the current scale weight.

376, 391, 406, 421 & 436: To calculate the dribble feed setpoint, add a predetermined number of pounds to the setpoint calculated in the previous block.

377, 392, 407, 422 & 437: Record the starting point.

378, 393, 408, 423 & 438: Run the feeder fast.

379, 394, 409, 424 & 439: Is the scale below the dribble feed point? If not, return to 378.

380, 395, 410, 425 & 440: If yes, run the feeder slow.

381, 396, 411, 426 & 441: Is the feeder below the setpoint? If not, run the feeder slow.

382, 397, 412, 427 & 442: If yes, stop the feeder and wait for the scale to settle.

383, 398, 413, 428 & 443: Calculate the actual amount placed into the blender by subtracting the current scale reading from the starting point.

383A, 398A, 413A, 428A & 443A: Then return to the subroutine shown in FIG. 14 by proceeding through blocks 275-279.

Figure 26:
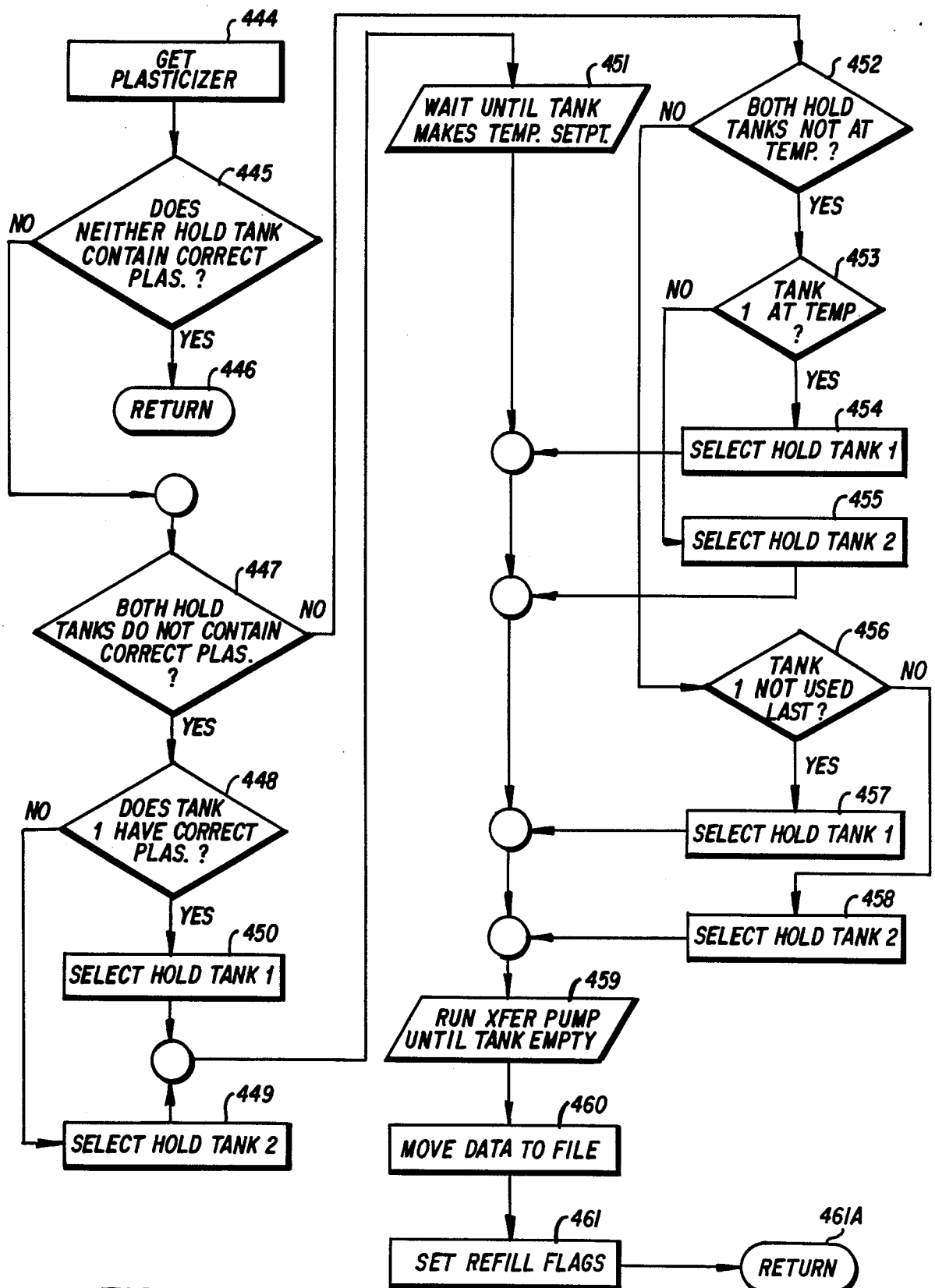

Plasticizer Subroutine (FIG. 26)

FIG. 26 amplifies FIGS. 17 and 19, blocks 307 and respectively, by more fully setting forth the Get Plasticizer subroutine. The routine steps are legended in abbreviated form and are listed more fully below.

444 Get the plasticizer.

445 Does neither hold tank contain the correct plasticizer?

446 If yes, then return to the subroutine shown in FIG. 17.

447 If the answer to 445 is no, then is it true that both hold tanks do not contain the correct plasticizer?

448 If yes, then does tank 1 have the correct plasticizer?

449 If the answer to 448 is no, then select hold tank 2.

450 If the answer to 448 is yes, then select hold tank 1.

451 Wait until the tank reaches the temperature setpoint.

452 If the answer to 447 is no, then are both hold tanks not at temperature?

453 If the answer is yes, then is tank 1 at temperature?

454 If the answer to 453 is yes, then select hold tank 1.

455 If the answer to 453 is no, then select hold tank 2.

456 If the answer to 452 is no, then was tank 1 not used last?

457 If the answer is yes, then select hold tank 1.

458 If the answer to 456 is no, then select hold tank 2.

459 Run the transfer pump until the tank is empty.

460 Move data to a file.

461 Set the refill flags.

461A Return control to the subroutine shown in FIG. 17.

Figures 27, 28, 29:
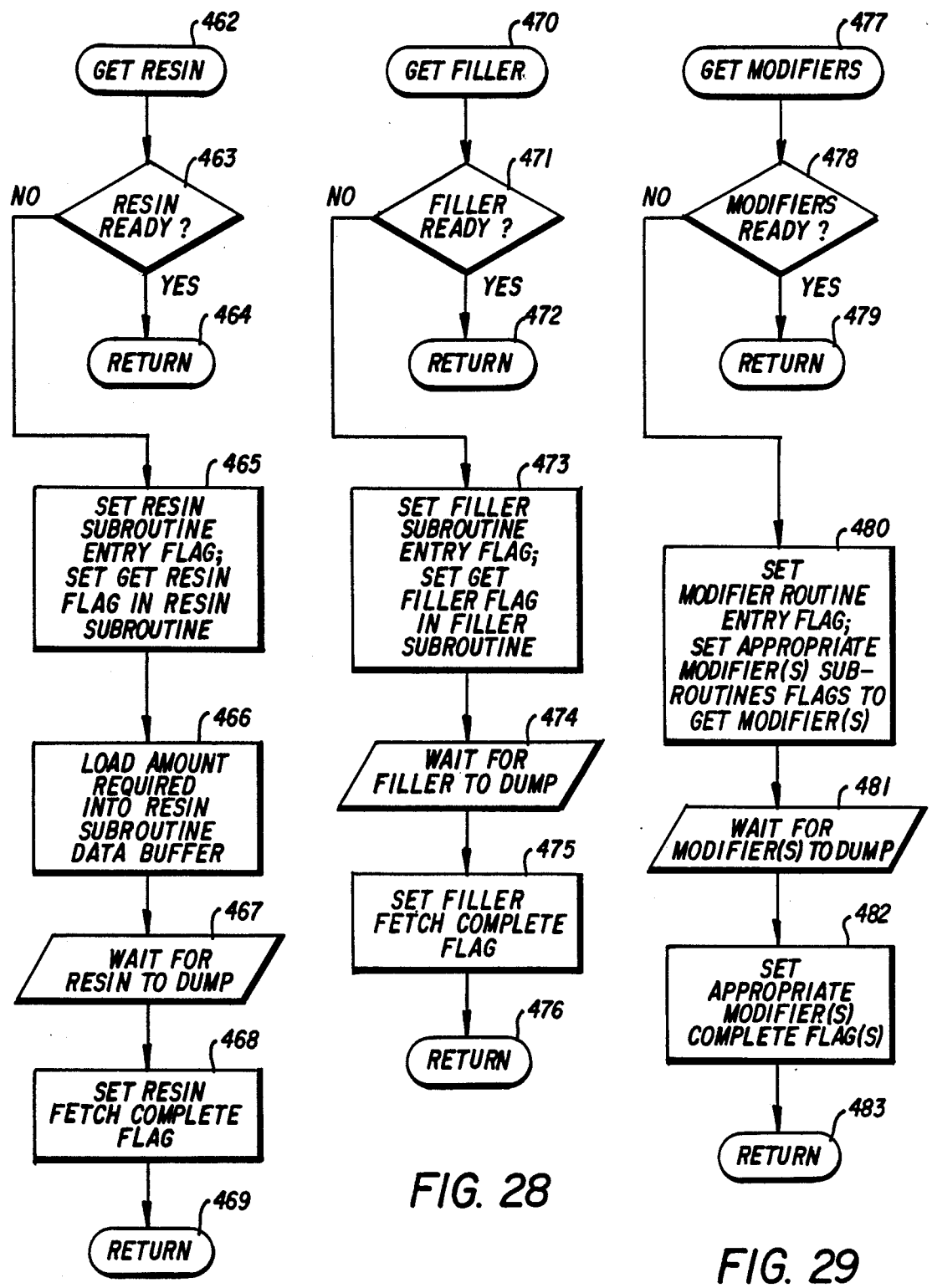

Get Resin Subroutine (FIG. 27)

FIG. 27 amplifies FIGS. 17 and 19, blocks 312 and respectively, by more fully setting forth the Get Resin subroutine. The routine steps are legended in abbreviated form and are listed more fully below.

462 Subroutine that loads the blenders with resin.

463 Is the resin hopper full and ready to dump?

464 If the answer is no, return to the calling subroutine.

465 If the answer is yes, set the resin subroutine entry flag to indicate to the other blender that this routine is in use; set the dump flag in the resin routine to indicate that a blender is ready to accept a load.

466 Then, pass the amount of resin required to the resin routine.

467 Wait for the resin to finish dumping.

468 Then, set the resin fetch complete flag in the calling routine.

469 Return to the calling routine.

Get Filler Subroutine (FIG. 28)

FIG. 28 amplifies FIG. 17 and 19, blocks 316 and 349 respectively, by more fully setting forth the Get Filler subroutine. The routine steps are legended in abbreviated form and are listed more fully below.

470 Subroutine that loads the blenders with filler.

471 Is the filler hopper full and ready to dump?

472 If the answer is no, then return to the calling routine.

473 If the answer is yes, set the filler subroutine entry flag to indicate to the other blender that this routine is in use; set the dump flag in the filler routine to indicate that a blender is ready to accept a load.

474 Then wait for the filler to finish dumping.

475 Set the filler fetch complete flag in the calling routine.

476 Return to the calling routine.

Get Modifiers Subroutine (FIG. 29)

FIG. 29 amplifies FIGS. 17 and 19, blocks 321 and respectively, by more fully setting forth the Get Modifiers subroutine. The routine steps are legended in abbreviated form and are listed more fully below.

477 Subroutine that loads the blenders with modifiers.

478 Are the modifier hoppers full and ready to dump.

479 If the answer is no, return to the calling routine.

480 If the answer is yes, set the modifiers routine entry flag to indicate the other blender that this routine is in use; set the individual dump flags in the appropriate modifiers routines to indicate that a blender is ready to accept a load.

481 Wait for all of the appropriate modifiers to complete their dump cycles.

482 Set the appropriate modifier fetch complete flags in the calling routine.

483 Return to the calling routine.

Figure 30:
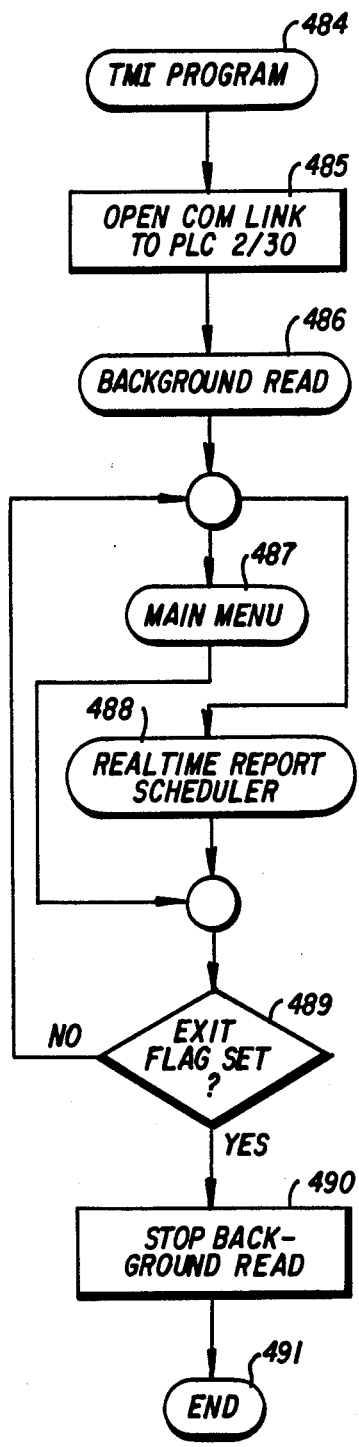

TMI Computer Operator Station Program (FIG. 30)

The TMI computer operator station program performed by the computer is described with reference to FIG. 30, which is a flow diagram of the TMI computer program. In FIG. 30 the routine steps are legended in an abbreviated form and are listed more fully below.

484: This is the TMI computer program.

485: Open the communication link to the programmable controller.

486: Perform the background read subroutine.

487: Perform the main menu subroutine.

488: Perform the real time report scheduler subroutine concurrently with the main menu subroutine.

489: Is the exit flag set? If not perform the main menu and real time report scheduler subroutines.

490: If the exit flag is set, then stop performing the background read subroutine noted in block 486.

491: End the TMI computer program.

Figure 31A:
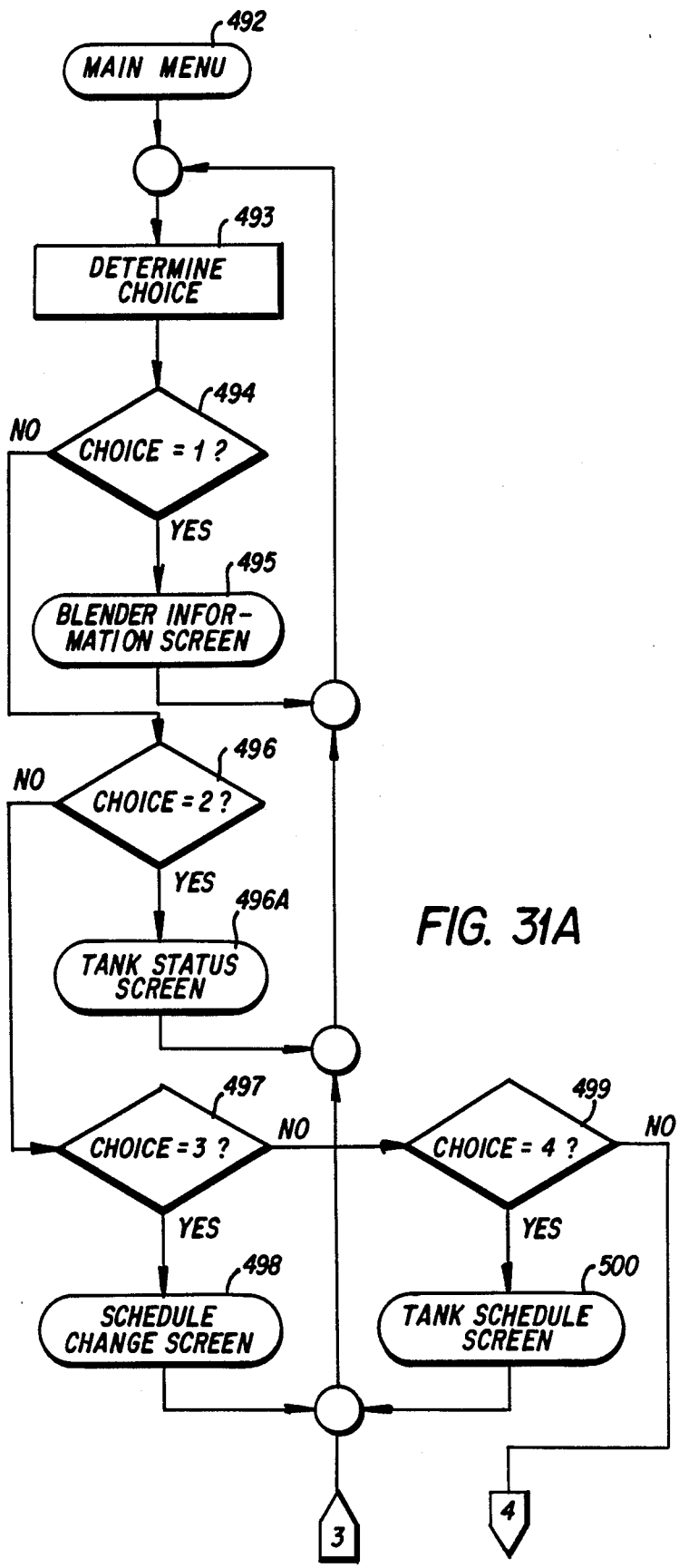
Figure 31B:
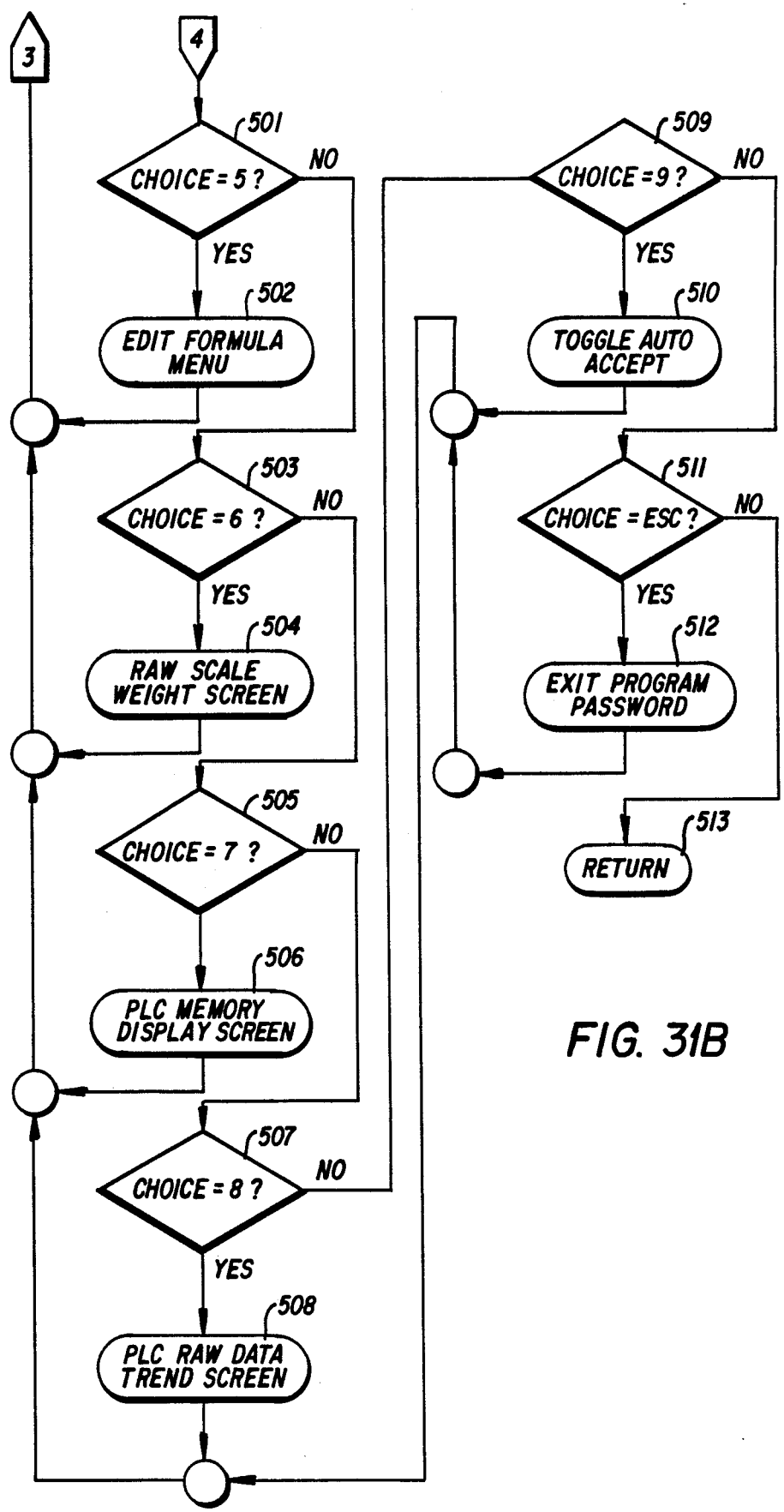

Main Menu Subroutine (FIG. 31)

FIG. 31 is the main menu subroutine referred to in block 487 of FIG. 30. The routine steps are legended in abbreviated form and are listed more fully below.

492: This is the main menu subroutine.
493: Determine a choice of menu selections.
494: Is choice 1 chosen?
495: If choice 1 was chosen, then perform the blender information screen (choice 1) subroutine and return to block 493.
496: If choice 1 was not chosen, is choice 2 chosen?
497: If choice 2 was chosen, then perform the tank status screen (choice 2) subroutine and return to block 493.
497: If choice 2 was not chosen, is choice 3 chosen?
498: If choice 3 was chosen, then perform the schedule change screen (choice 3) subroutine and return to block 493.
499: If choice 3 was not chosen, then was choice 4 chosen?
500: If choice 4 was chosen, then perform the tank schedule screen (choice 4) subroutine and return to block 493.
501: If choice 4 was not chosen, then is choice 5 chosen?
502: If choice 5 was chosen, then perform the edit formula menu (choice 5) subroutine and return to block 493.
503: If choice 5 was not chosen, then is choice 6 chosen?
504: If choice 6 was chosen, then perform the raw scale weight screen (choice 6) subroutine and return to block 493.
505: If choice 6 was not chosen, then was choice 7 chosen?
506: If choice 7 was chosen, then perform the programmable controller memory display screen (choice 7) subroutine and return to block 493.
507: If choice 7 was not chosen, is choice 8 chosen?
508: If choice 8 was chosen, then perform the programmable controller raw data trend screen (choice 8) subroutine and return to block 493.
509: If choice 8 was not chosen, is choice 9 chosen?
510: If choice 9 was chosen, then perform the toggle auto accept (choice 9) subroutine and return to block 493.
511: If choice 9 was not chosen, then do you wish to escape from this subroutine?
512: If the answer to block 511 is yes, then perform the exit program password subroutine and return to block 493.
513: If it is not your choice to escape from this subprogram, then return to the main program shown in FIG. 30.

Edit Formula Menu (FIG. 32)

FIG. 32 is the subroutine identified in block 502 of FIG. 31 entitled edit formula menu. The subroutine steps are legended in abbreviated form and are listed more fully below.

514: This subroutine is entitled edit formula menu.
515: Is choice 1 selected?
516: If choice 1 was selected, then perform the change formula screen (choice 1) subroutine and return to block 515.
517: If choice 1 was not selected, is choice 2 selected?
518: If choice 2 was selected, then perform the formula information screen (choice 2) subroutine and return to block 515.
519: If choice 2 was not selected, is choice 3 selected?
520: If choice 3 was selected, then perform the formula backup and restore (choice 3) subroutine and return to block 515.
521: If choice 3 was not selected, then is choice 4 selected?
522: If choice 4 was selected, then return to the program (choice 4) shown in FIG. 31. If choice 4 was not selected, then return to block 515.

Figures 33, 34:
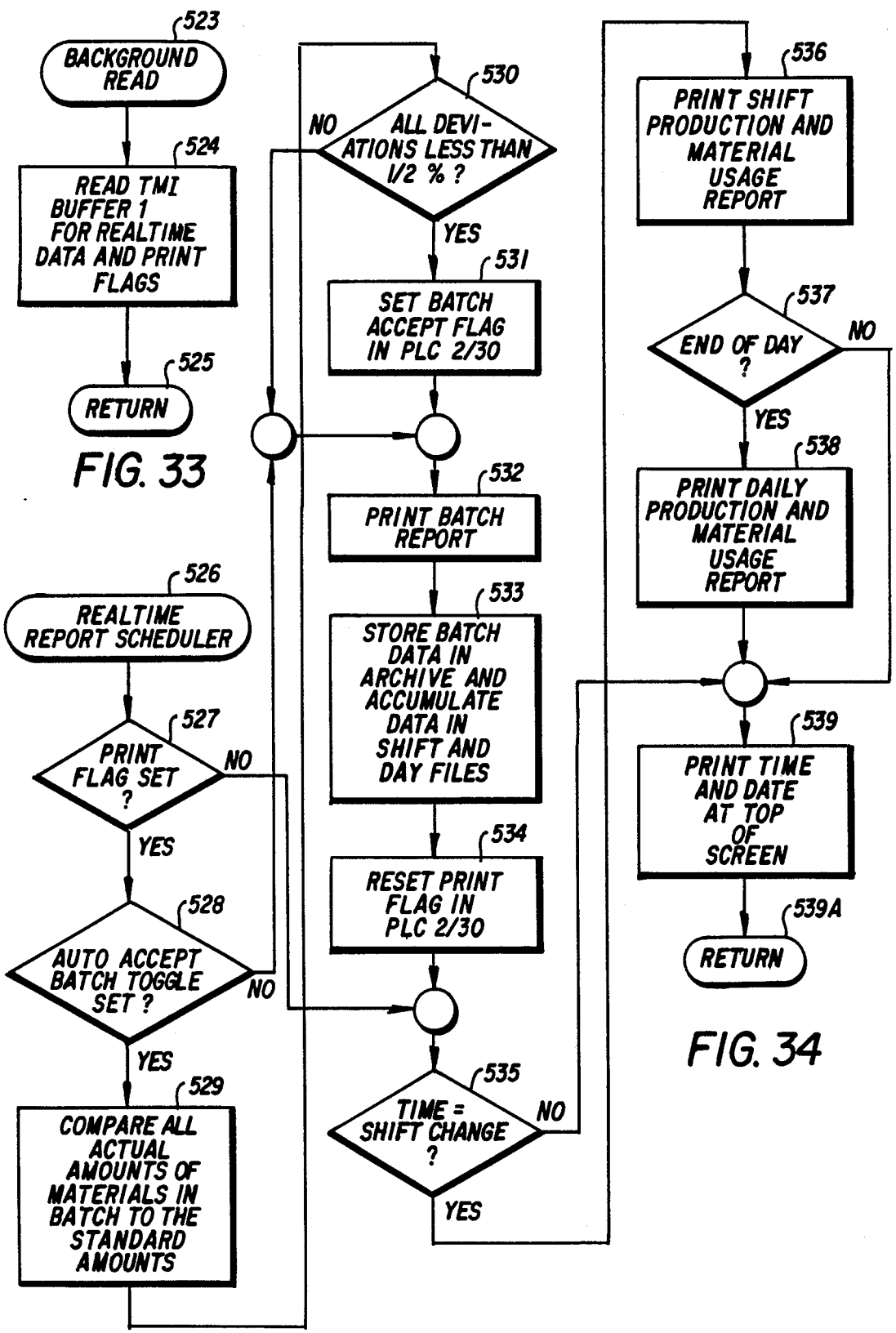

Background Read Subroutine (FIG. 33)

FIG. 33 is a logic flow diagram of the background read subroutine shown in block 486 of FIG. 30. In FIG. the routine steps are legended in abbreviated form and are listed more fully below.

523: This is the background read subroutine.
524: Read the TMI buffer 1 for real time data and print flags.
525: Return to the main TMI program shown in FIG. 30.

Real Time Report Scheduler Subroutine (FIG. 34)

FIG. 34 is a logic flow diagram of the real time report scheduler subroutine shown in block 488 of FIG. 30. In FIG. 34, the routine steps are legended in abbreviated form and are listed more fully below.

526: This is the real time report scheduler subroutine.
527: Is the print flag set?
528: If the print flag is set, then is the auto accept batch toggle set?
529: If the answer to block 528 is yes, then compare all actual amounts of materials in the batch to the standard amounts.
530: Are all deviations less than ½ percent?
531: If the answer to block 530 is yes, then set the batch accept flag in a programmable controller.
532: If the answer to block 528 was negative or the answer to block 530 was negative, then print the batch report.
533: Store the batch data in archives and accumulate the data in shift and day files.
534: Reset the print flag in the programmable controller.
535: If the answer to block 527 was negative or after resetting the print flag, then does the time equal a shift change?
536: If the answer is yes, then print the shift production and material usage report.
537: Is it the end of day?
538: If the answer to block 537 is yes, then print a daily production and material usage report.
539: If the answer to block 537 or block 535 was negative, then print the time and date at the top of the screen.
539a: Return to the main TMI computer program shown in FIG. 30.

Blender Information Screen Subroutine (FIG. 35)

FIG. 35 is a logic flow diagram of the blender information screen subroutine noted in FIG. 31, block 495. FIG. 35 amplifies more fully the blender information screen subroutine, and the routine steps are legended in abbreviated form and are listed more fully below.

540: This is the blender information screen subroutine.

541: Read the TMI buffer 1 for real time data.
542: Display the standard and actual batch data.
543: Blink on the computer screen the material currently being put into the blenders.
544: Red line material greater than ½ percent out of specification.
545: Has the escape key been pressed?
545a: If yes, then return to the main menu subprogram shown in FIG. 31. If not, then return to block 541.

The Tank Status Screen Subroutine (FIG. 36)

FIG. 36 amplifies more fully the tank status screen subroutine shown in FIG. 31, block 497. The routine steps are legended in abbreviated form and are listed more fully below.
546: This is the tank status screen subroutine.
547: Read TMI buffer 2 for real time data.
548: Display the tank screen and real time data.
549: Has the escape key been pressed?
550: If yes, then return to the main menu subroutine shown in FIG. 31. If not, then return to block 547.

The Schedule Change Screen Subroutine (FIG. 37)

FIG. 37 amplifies more fully the schedule change screen subroutine referred to in block 498 of FIG. 31. The routine steps are legended in abbreviated form and are listed more fully below.
551: This is the schedule change screen subroutine.
552: Read the currently scheduled formulas in the TMI buffer no. 1.
553: Display the scheduled and running formulas.
554: Do we have the edit scheduled formula?
555: If yes, then edit the scheduled formula and write that formula in the programmable controller. If not, then return to block 552.
556: Has the escape key been pressed?
557: If yes, then return to the main menu subroutine shown in FIG. 31. If not, then return to block 552.

Figure 38:
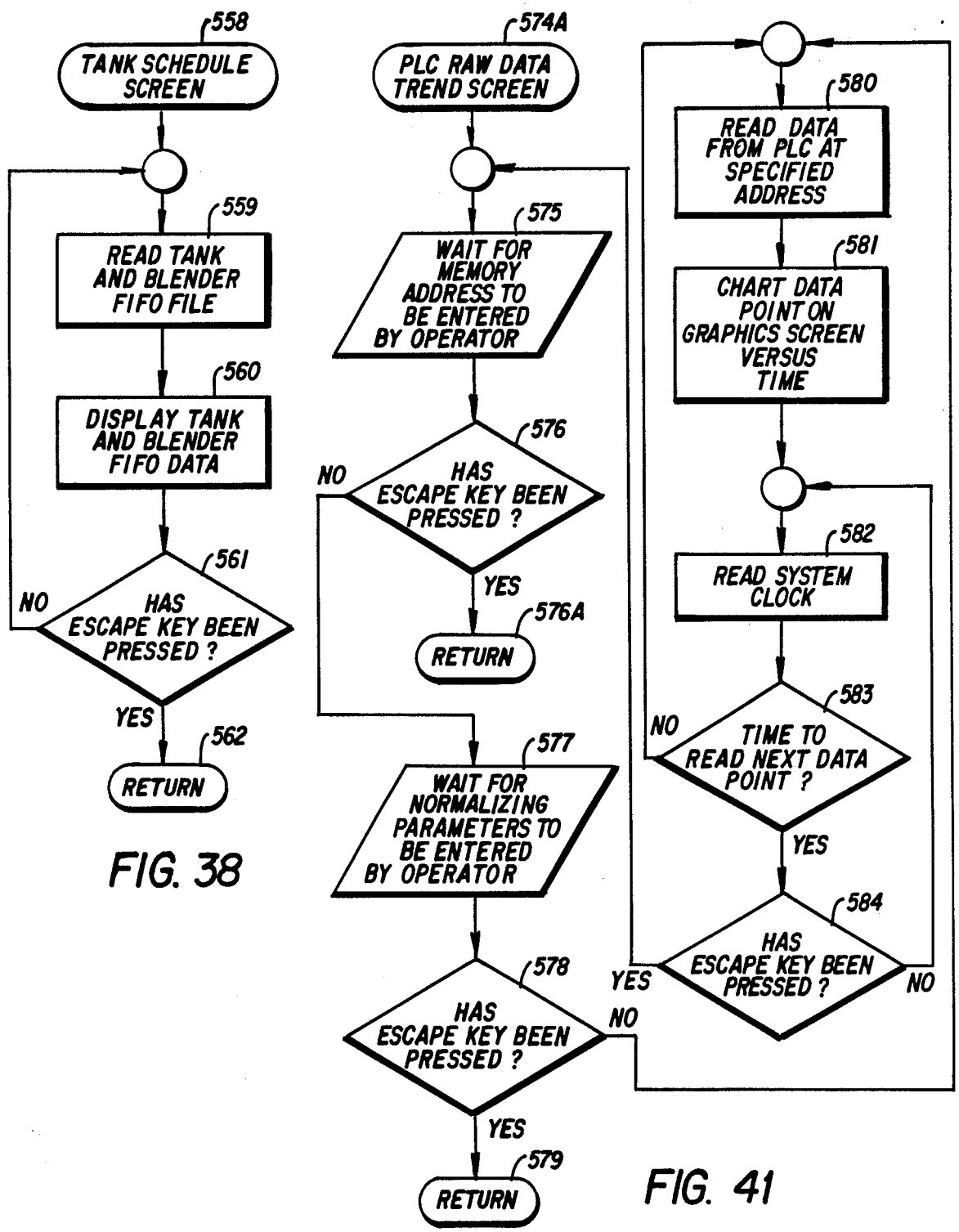

The Tank Schedule Screen Subroutine (FIG. 38)

FIG. 38 amplifies more fully the tank schedule screen subroutine referred to in block 500 of FIG. 31. The routine steps are legended in abbreviated form and are listed more fully below.
558: This is the tank schedule screen subroutine.
559: Read the tank and blender first-in first-out file.
560: Display the tank and blender first-in first-out data.
561: Has the escape key been pressed?
562: If yes, then return to the main menu subroutine shown in FIG. 31. If not, then return to block 559.

Figures 39, 40:
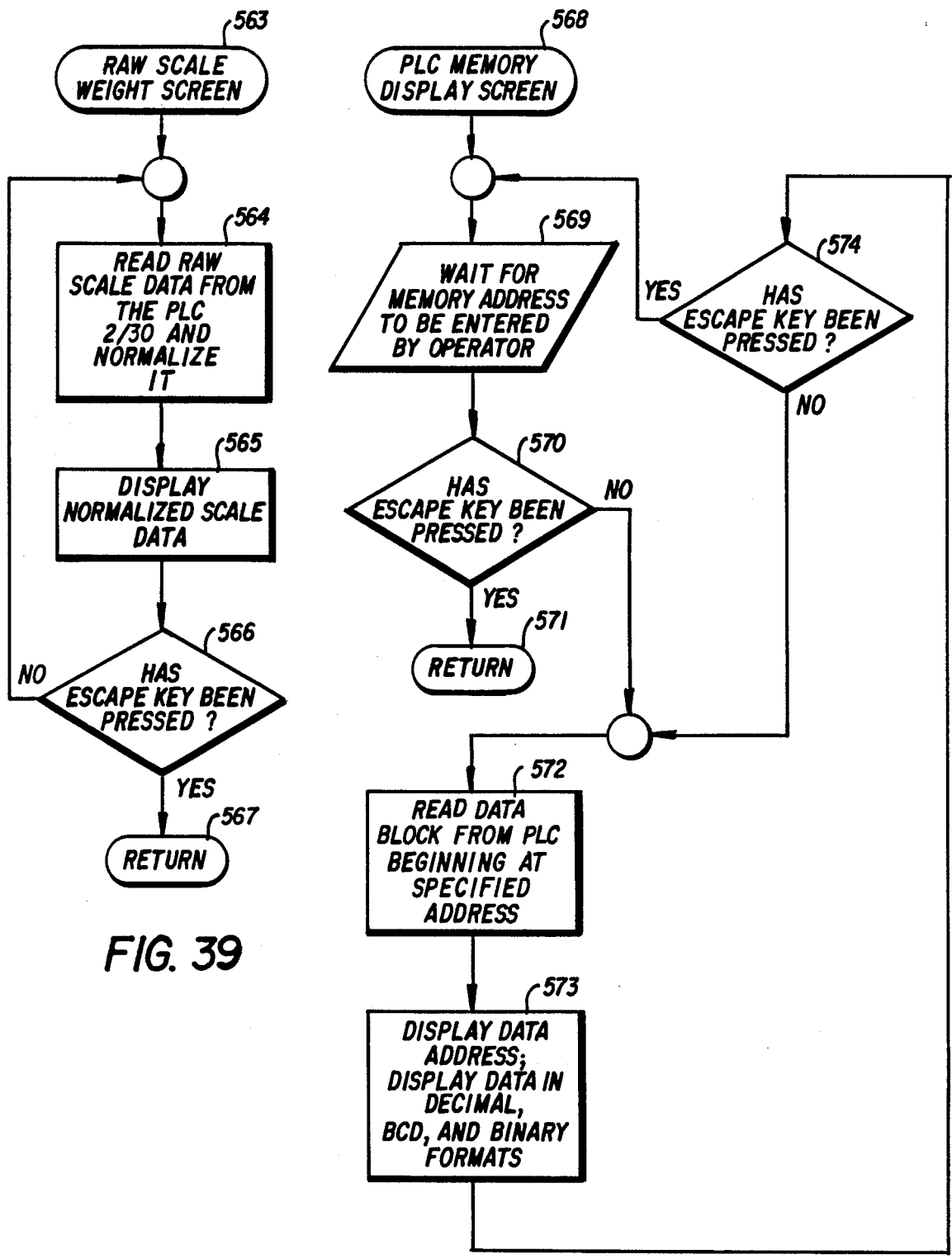

The Raw Scale Weight Screen Subroutine (FIG. 39)

FIG. 39 amplifies more fully the raw scale weight screen subroutine referred to in block 504 of FIG. 31. The routine steps are legended in abbreviated form and are listed more fully below.
563: This is the raw scale weight screen subroutine.
564: Read the raw scale data from the programmable controller and normalize it.
565: Display the normalized scale data.
566: Has the escape key been pressed?
567: If yes, then return to the main menu subroutine shown in FIG. 31. If not, then return to block 564.

The Programmable Controller Memory Display Screen Subroutine (FIG. 40)

FIG. 40 amplifies more fully the programmable controller memory display screen subroutine referred to in block 506 of FIG. 31. The routine steps are legended in abbreviated form and are listed more fully below.
568: This is the programmable controller memory display screen subroutine.
569: Wait for the memory address to be entered by an operator.
570: Has the escape key been pressed?
571: If yes, then return to the main memory subroutine shown in FIG. 31. If not, then proceed to block 572.
572: Read the data block from the programmable controller beginning at the specified address.
573: Display the data address. Display the data in decimal, binary coded decimal, and binary formats.
574: Has the escape key been pressed? If yes, then return to block 569. If not, then return to block 572.

The Programmable Controller Raw Data Trend Screen Subroutine (FIG. 41)

FIG. 41 amplifies more fully the programmable controller raw data trend screen subroutine referred to in block 508 of FIG. 31. The routine steps are legended in abbreviated form and are listed more fully below.
574a: This is the programmable controller raw data trend screen subroutine.
575: Wait for the memory address to be entered by an operator.
576: Has the escape key been pressed?
576a: If yes, then return to the main menu subroutine shown in FIG. 31.
577: If the answer to block 576 is negative, then wait for the normalizing parameters to be entered by an operator.
578: Has the escape key been pressed?
579: If yes, then return to the main menu subroutine shown in FIG. 31. If not, then proceed to block 580.
580: Read data from the programmable controller at a specified address.
581: Chart the data point on the graphics screen versus time.
582: Read the system clock.
583: Is it time to read the next data point? If yes, then return to block 580.
584: If the answer to block 583 is negative, then has the escape key been pressed? If the answer is yes, then return to block 575. If the answer is no, then return to block 582.

Figure 42:
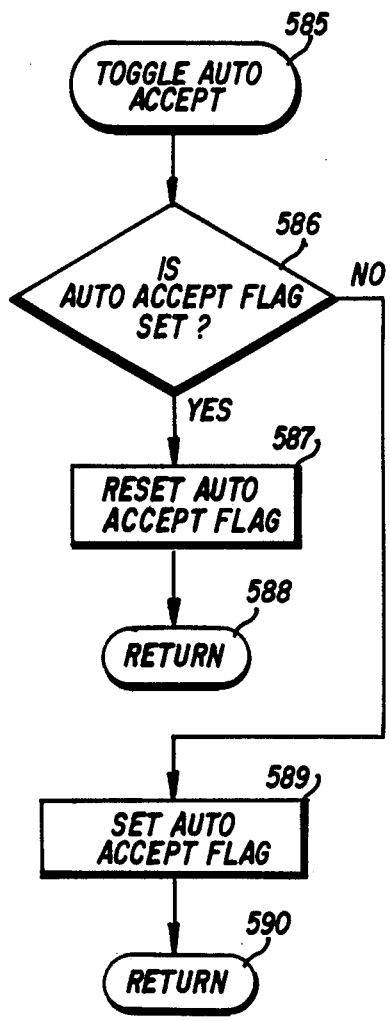

Toggle Auto Accept Subroutine (FIG. 42)

FIG. 42 amplifies more fully the toggle auto accept subroutine referred to in block 510 of FIG. 31. In essence, the computer through this subroutine and without operator intervention will accept automatically, based on data presented to it, blended material if properly blended and scaled. If the computer obtains data indicating an improper blend, then acceptance of the blend by the computer will not be automatic, but instead will be controlled manually by an operator. The routine steps are legended in abbreviated form and are listed more fully below.
585: This is the toggle auto accept subroutine.
586: Is the auto accept flag set?
587: If yes, then reset the auto accept flag.

588: Return to the main menu subroutine shown in FIG. 31.

589: If the answer to block 586 is negative, then set the auto accept flag.

590: Return to the main menu subroutine shown in FIG. 31.

The Exit Program Password Subroutine (FIG. 43)

FIG. 43 amplifies more fully the exit program password subroutine referred to in block 512 of FIG. 31. The routine steps are legended in abbreviated form and are listed more fully below.

591: This is the exit program password subroutine.

592: Wait for an operator to enter the exit program password.

593: Has the escape key been pressed?

594: If not, is the password valid?

595: If the answer to block 594 is yes, then set the exit flags.

596: If the answer to block 593 is yes or the answer to block 594 is no, then return to the main menu subroutine shown in FIG. 31.

Figure 44:
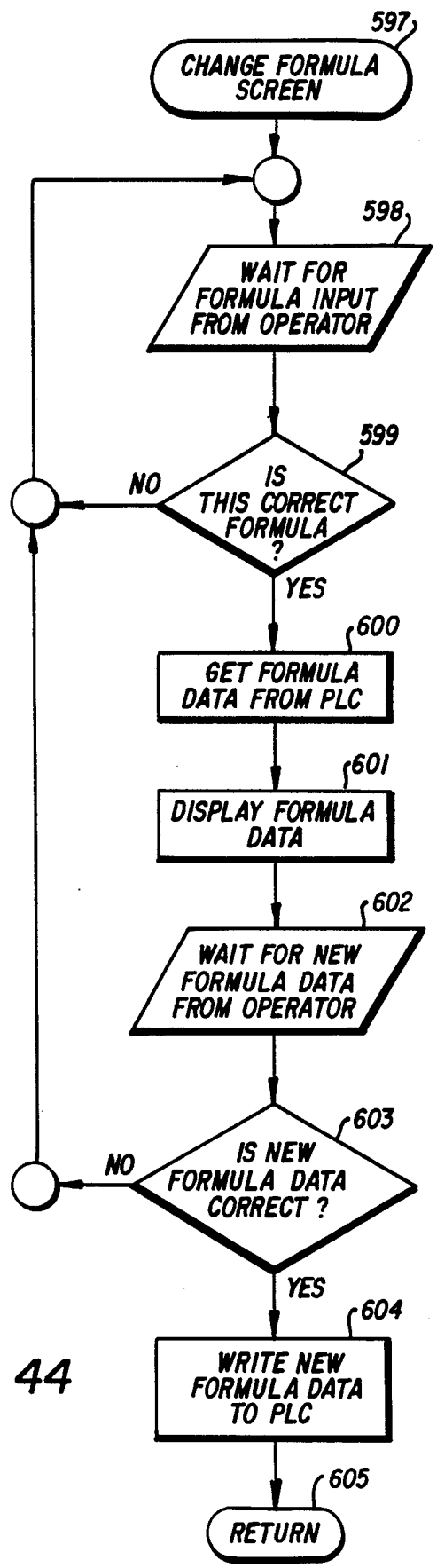

Change Formula Screen (FIG. 44)

FIG. 44 is a logic flow diagram of the change formula screen subroutine referred to in block 516 of FIG. 32. The routine steps are legended in abbreviated form and are listed more fully below.

597: This is the change formula screen subroutine.

598: Wait for a formula input from an operator

599: Is this a correct formula?

600: If yes, then obtain the formula data from the programmable controller. If not, then return to block 598.

601: Display the formula data.

602: Wait for the new formula data from the operator.

603: Is the new formula data correct? If not, then return to block 598.

604: If yes, then write the new formula data to the programmable controller.

605: Return to the subroutine shown in FIG. 32.

Formula Information Screen (FIG. 45)

FIG. 45 is a logic flow diagram of the formula information screen subroutine referred to in block 518 of FIG. 32. The routine steps are legended in abbreviated form and and are listed more fully below.

606: This is the formula information screen subroutine.

607: Wait for a formula name request from an operator.

608: Is this a correct formula? If not, then return to block 607.

609: If yes, then obtain formula data from the programmable controller.

610: Display the formula data.

611: Has the escape key been pressed? If not, then keep determining whether the escape key has been depressed.

612: If yes, then return to the subroutine shown in FIG. 32.

Formula Backup and Restore (FIG. 46)

FIG. 46 is a logic flow diagram of the formula backup and restore subroutine referred to in block 520 of FIG. 32.

The routine steps are legended in abbreviated form and are listed more fully below.

613: This is the formula backup and restore subroutine.

614: Wait for a choice from an operator.

615: Is the choice equal to the backup formula?

616: If yes, then get all formula data from the programmable controller.

617: Save all formula data in a TMI computer disk. If the choice is not a backup formula, then return to block 614.

618: Is the choice to restore the formula? If not, then proceed to block 621.

619: If yes, then get all formula data from the TMI computer disk.

620: Save all formula data in the programmable controller.

621: Is the choice to return to the calling subroutine?If not, proceed to block 614.

622: If yes, then return to the main subroutine shown in FIG. 32.

Figure 1:
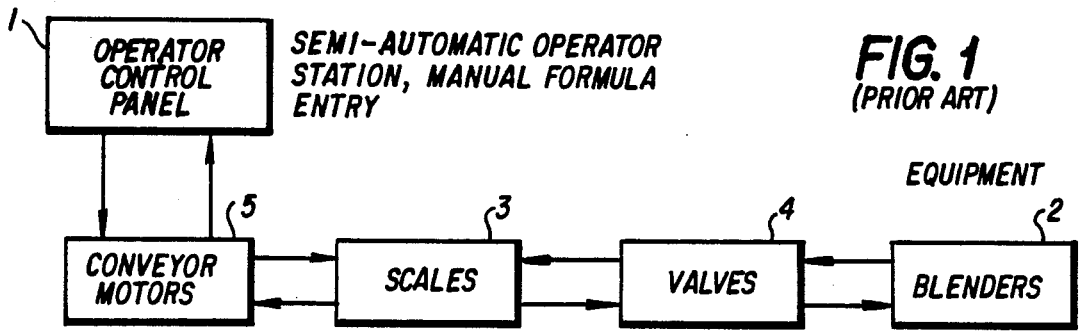
FIG. 1 is a schematic block diagram of a prior art, pre-1984 polyvinylchloride (PVC) batching control system used at Southwire Corporation.
Figure 2:
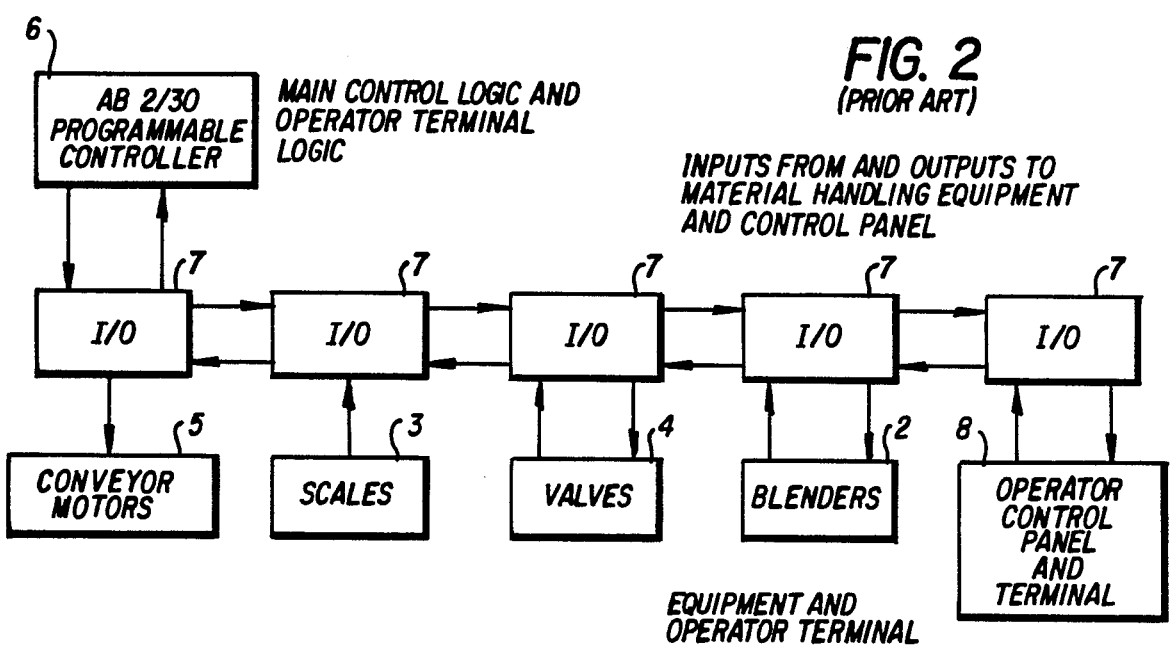
FIG. 2 is a schematic block diagram of a prior art, pre-1987 PVC batching control system used at Southwire Corporation.
Figure 47:
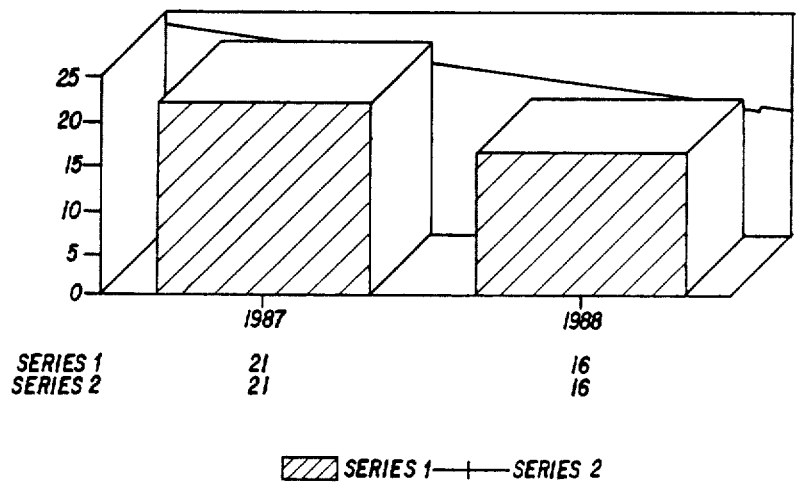
FIG. 47 is a table showing customer complaints between January and June of 1987 and January and June of 1988.

The insulation manufactured in accordance with the invention disclosed above, has obtained closer tolerances to given formulations then the prior art system shown in FIG. 2. FIG. 47 below shows the customer complaints between January and June of 1987 and January and June of 1988. A comparison of these customer complaints shows that the invention as now used in 1988 has caused a substantial reduction, 23.8%, in customer complaints over the prior art system shown in FIG. 2.

It is to be understood that even though the numerous characteristics and advantages of the present invention have been set forth in the foregoing description, together with details of the structure and function of the invention, the disclosure is illustrative only, and changes may be made in detail, especially in matters of shape, size, order and number of program steps, and arrangement of parts within the principle of the invention, to the full extent indicated by the broad general meaning of the terms in which the appended claims are expressed.

What is claimed is:

1. A method for producing metallic rod insulation containing a plurality of ingredients which comprises:
   storing said ingredients in containers;
   transmitting said ingredients to scales;
   establishing and storing in a digital controlling means a predetermined weight setpoint for each of said ingredients;
   weighing each of said ingredients in a scale and transmitting current weight data to said controlling means;
   obtaining a predetermined weight for each ingredient by subtracting said weight data for each ingredient from said predetermined weight setpoint until the difference is zero;
   verifying through a computing means that said predetermined weight has been obtained, and if not obtained contacting an operator to correct said current weight data to equal said predetermined weight; rejecting said ingredients if said current weight data is incorrectible;
   conveying said appropriately weighed ingredients to a blender as a result of commands from said controlling means;
   providing digital instructions to said blender from said controller means;
   blending said ingredients in said blender until they are mixed;

milling the blended ingredients into strips; and
extruding said strips onto the metallic rod to form an insulation around said metallic rod.

2. The method of claim 1, wherein said ingredients include plasticizers, fillers, a resin, and modifiers.

3. The method of claim 1 further comprising a mixing of said ingredients subsequent to said blending step.

4. The method of claim 1 further comprising a dicing of said strips into pellets prior to the extruding step.

5. The method of claim 2 further comprising a conveying of said ingredients between each of the storing, weighing, blending, milling and extruding steps.

6. The method of claim 2, wherein the weighing of said filler and plasticizer ingredients further comprises emptying said ingredients from their respective scales, calculating a setpoint for said filler and ingredients, loading said filler and plasticizer material into their respective scales, and obtaining a predetermined weight of said filler and plasticizer ingredients in said scales when the difference between said filler and plasticizer setpoints and filler and plasticizer weights is equal to zero.

7. The method of claim 2, wherein the weighing of said resin and plasticizer ingredients further comprises filling one scale with resin and one scale with plasticizer, determining said resin and plasticizer setpoints, and emptying said resin and plasticizer into a blender when said setpoints have been reached for each ingredient.

8. The method of claim 2, wherein the weighing of said plasticizer ingredients further comprises selecting said plasticizer ingredients and placing them in a scale, determining a first setpoint for those plasticizer ingredients, calculating a second setpoint by setting said second setpoint equal to a current weight of said plasticizer ingredients plus a first setpoint, turning a pump means on and then off until said second setpoint is reached, waiting for a predetermined period of time; subtracting said second setpoint from said current weight of said plasticizer ingredients to determine if an overshoot amount of plasticizer ingredients exist, and if said overshoot exists, removing said overshoot amount by said pump means.

9. The method of claim 2 further comprising heating of said plasticizer ingredients prior to the blending of said ingredients together.

10. The method of claim 1 which further comprises funnelling said ingredients into a blender after the weight setpoint for each ingredient is obtained.

11. The method of claim 10 which further comprises processing the modifier ingredients through a chute prior to said funnelling step.

12. The method of claim 3 which further comprises placing the blended ingredients into a hopper prior to the mixing step.

13. An apparatus for manufacturing insulation for a metallic rod comprising,
(a) means for storing a plurality of ingredients which will be used in the manufacture of said insulation;
(b) means in direct communication with said storing means for weighing each of said ingredients until a predetermined weight setpoint for each ingredient is obtained;
(c) means in direct communication with said weighing means for blending said ingredients together;
(d) means in series with said blending means for processing said ingredients into insulation around said metallic rod;
(e) digital means for receiving inputs from said weighing means and for issuing commands to a conveying means to supply a correct weight of each ingredient to said blending means; and
(f) computing means interfacing with and issuing commands to said digital means for verifying that a correct amount of material has been sent to the blender means, for directing an operator to correct said amount of material if an incorrect amount was placed into the blender means, and for rejecting said amount of material if correction is unobtainable.

14. The apparatus of claim 13, further comprising mixing means in series with said blending means to mix the blended ingredients together into a dry blend.

15. The apparatus of claim 14, wherein said ingredients comprise plasticizers, fillers, a resin, and modifiers.

16. The apparatus of claim 15, further comprising milling means in series with said mixing means to melt said ingredients into strips.

17. The apparatus of claim 16, further comprising dicing means in series with said milling means to cut said strips into pellets.

18. The apparatus of claim 17, further comprising extruding means in series with said dicing means for extruding said pellets into insulation.

19. The apparatus of claim 14 wherein the digital means is a programmable controller.

20. The apparatus of claim 14, wherein said digital means and blending and weighing means are connected together by a plurality of input/output devices for transferring data and instructions between said digital, blending, and weighing means.

21. The apparatus of claim 14, wherein said computing means contains a graphics panel to display data and a flow of said ingredients through a batching process.

22. The apparatus of claim 14, wherein said computing means may be disabled by a personal computer connected to said digital means through a modem.

* * * * *

UNITED STATES PATENT AND TRADEMARK OFFICE
CERTIFICATE OF CORRECTION

PATENT NO. : 4,961,887

DATED : October 9, 1990

INVENTOR(S) : Michael G. CRUMPLER et al

It is certified that error appears in the above-identified patent and that said Letters Patent is hereby corrected as shown below:

IN THE DRAWINGS:

Please insert Fig. 47, as shown on the attached sheet.

Signed and Sealed this

Twenty-sixth Day of May, 1992

*Attest:*

DOUGLAS B. COMER

*Attesting Officer*

*Acting Commissioner of Patents and Trademarks*

CUSTOMER COMPLAINTS
JAN-JUN 1987 VS JAN-JUN 1988